US012367878B2

(12) United States Patent
Prasad et al.

(10) Patent No.: US 12,367,878 B2
(45) Date of Patent: *Jul. 22, 2025

(54) DYNAMIC VOICE SEARCH TRANSITIONING

(71) Applicant: Amazon Technologies, Inc., Seattle, WA (US)

(72) Inventors: Rohit Prasad, Acton, MA (US); Anna Santos, Seattle, WA (US); David Sanchez, Seattle, WA (US); Jared Strawderman, Santa Clara, CA (US); Sarah Castle, Seattle, WA (US); Kerry Hammil, Seattle, WA (US); Christopher Schindler, Bainbridge Island, WA (US); Timothy Twerdahl, Los Altos, CA (US); Joseph Tavares, Kenmore, WA (US); Bartek Gulik, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,896

(22) Filed: Jan. 3, 2024

(65) Prior Publication Data

US 2024/0221739 A1 Jul. 4, 2024

Related U.S. Application Data

(63) Continuation of application No. 17/000,886, filed on Aug. 24, 2020, now Pat. No. 11,908,467, which is a
(Continued)

(51) Int. Cl.
*G10L 21/00* (2013.01)
*G10L 15/22* (2006.01)
(Continued)

(52) U.S. Cl.
CPC ....... *G10L 15/22* (2013.01); *H04N 21/42225* (2013.01); *H04N 21/478* (2013.01); *H04N 21/4828* (2013.01); *G10L 2015/223* (2013.01)

(58) Field of Classification Search
CPC ........ G06F 16/24; G06F 16/245; G06F 40/00; H04N 21/41; H04N 21/42225;
(Continued)

(56) References Cited

U.S. PATENT DOCUMENTS 8,000,972 B2 8/2011 Candelore
8,798,995 B1 8/2014 Edara
(Continued)

FOREIGN PATENT DOCUMENTS

WO WO-2011034310 A3 * 3/2011 ........... G06F 1/1626

*Primary Examiner* — Michael Ortiz-Sanchez
(74) *Attorney, Agent, or Firm* — Eversheds Sutherland (US) LLP

(57) ABSTRACT

Systems, methods, and computer-readable media are disclosed for dynamic voice search transitioning. Example methods may include receiving, by a computer system in communication with a display, a first incoming voice data indication, initiating a first user interface theme for presentation at a display, wherein the first user interface theme is a default user interface theme, and receiving first voice data. Example methods may include sending the first voice data to a remote server for processing, receiving an indication from the remote server to initiate a second user interface theme, and initiating the second user interface theme for presentation at the display.

20 Claims, 14 Drawing Sheets

Related U.S. Application Data continuation of application No. 14/869,496, filed on Sep. 29, 2015, now Pat. No. 10,770,067.

(60) Provisional application No. 62/215,691, filed on Sep. 8, 2015.

(51) Int. Cl.
    *G10L 25/00*     (2013.01)
    *H04N 21/422*     (2011.01)
    *H04N 21/478*     (2011.01)
    *H04N 21/482*     (2011.01)

(58) Field of Classification Search
CPC .... H04N 21/47; H04N 21/478; H04N 21/475; H04N 21/472; H04N 21/4828; H04N 21/4821; G10L 2015/223; G10L 15/22; G10L 2015/221; G10L 2015/225; G10L 15/00
See application file for complete search history.

(56) References Cited

U.S. PATENT DOCUMENTS

| | | | |
|---|---|---|---|
| 9,338,493 | B2 | 5/2016 | Van Os et al. |
| 10,770,067 | B1 | 9/2020 | Prasad et al. |
| 2002/0019732 | A1 | 2/2002 | Kikinis et al. |
| 2003/0078784 | A1 | 4/2003 | Jordan et al. |
| 2003/0229900 | A1 | 12/2003 | Reisman |
| 2004/0128342 | A1 | 7/2004 | Maes et al. |
| 2004/0236778 | A1 | 11/2004 | Junqua et al. |
| 2007/0038436 | A1 | 2/2007 | Cristo et al. |
| 2009/0112592 | A1 | 4/2009 | Candelore |
| 2009/0228464 | A1 | 9/2009 | Jones et al. |
| 2010/0066684 | A1 | 3/2010 | Shahraray et al. |
| 2011/0313775 | A1 | 12/2011 | Laligand et al. |
| 2012/0019732 | A1 | 1/2012 | Lee et al. |
| 2012/0075178 | A1 | 3/2012 | Cho et al. |
| 2012/0295708 | A1 | 11/2012 | Hernandez-Abrego et al. |
| 2013/0024197 | A1* | 1/2013 | Jang .................. H04N 21/4828 704/E15.001 |
| 2013/0033644 | A1* | 2/2013 | Kim .................. H04N 21/4821 348/E5.097 |
| 2013/0275899 | A1 | 10/2013 | Schubert et al. |
| 2014/0040748 | A1 | 2/2014 | Lemay et al. |
| 2014/0108019 | A1 | 4/2014 | Ehsani et al. |
| 2014/0267933 | A1 | 9/2014 | Young |
| 2015/0039310 | A1 | 2/2015 | Clark et al. |
| 2015/0053781 | A1 | 2/2015 | Nelson et al. |
| 2015/0141079 | A1 | 5/2015 | Wang et al. |
| 2015/0169284 | A1 | 6/2015 | Quast et al. |
| 2015/0206529 | A1 | 7/2015 | Kwon et al. |
| 2015/0319509 | A1 | 11/2015 | Huang et al. |

* cited by examiner

DYNAMIC VOICE SEARCH TRANSITIONING

CROSS REFERENCE TO RELATED APPLICATIONS

This application is a continuation of U.S. Non-provisional application Ser. No. 17/000,886, filed Aug. 24, 2020, which claims the benefit of U.S. Non-provisional application Ser. No. 14/869,496, filed Sep. 29, 2015, which claims benefit of U.S. Provisional Application No. 62/215,691, filed Sep. 8, 2015, the disclosures of which are hereby incorporated herein by reference in their entireties.

BACKGROUND

Users may view or consume content, such as audio or video content, on televisions or other content consumption devices. In order to identify and select content for consumption, users may desire to be presented with content selection options, for example, via voice-based searching. In another example, users may desire to be presented with information in response to voice-based information requests. While consuming content, users may desire to consume different content or different information, and may desire a smooth transition from the original content to the different content or information.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
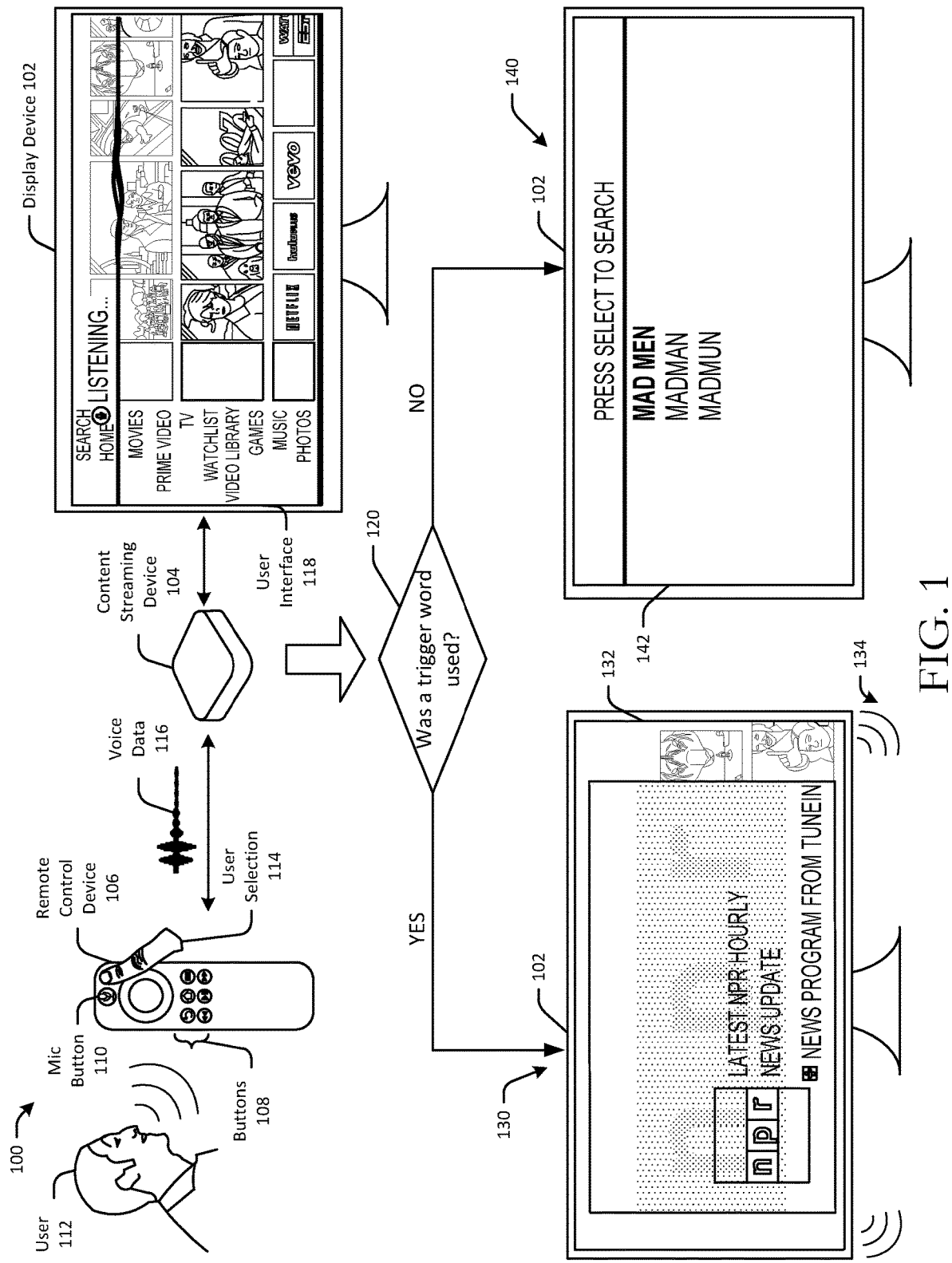
FIG. 1 is a schematic diagram of an example use case illustrating dynamic voice search transitioning in accordance with one or more example embodiments of the disclosure.

This disclosure relates to, among other things, devices, systems, methods, computer-readable media, techniques, and methodologies for transitioning user interfaces on an electronic display operatively coupled to a content streaming device for various voice-based functions. User interfaces of the disclosure may indicate to a user a manner in which a voice input or voice data is being or has been processed, as well as information related to a stage of processing of voice data, post-processing information, such as search results or desired information, and the like. Embodiments of the disclosure may generate smooth transitions between various user interfaces irrespective of whether voice input is, for example, a voice command, a voice search, a voice query or verbal request for information, and the like. Users may determine, based at least in part on user interfaces of the disclosure, an operational mode of a device, a processing stage of a device or system, information related to a voice query, and other information. For example, embodiments of the disclosure may include graphical user interfaces (GUIs) designed to communicate that voice input is being received or detected, how voice data will be processed (e.g., as a voice search or verbal query, etc.), results of voice data processing (e.g., search results, requested information such as news or weather, etc.), and other information.

Embodiments of the disclosure may facilitate dynamic voice search transitioning, such that users may identify voice data information from a user interface at an electronic display. Users may consume content on a content providing device or display device, including, but not limited to, a viewing device such as a television, a laptop computer, a tablet, a computer monitor, or the like, and/or devices configured to provide audio content, such as a speaker-type device, including, but not limited to, music, audio books, machine voice responses, spoken text, and/or any other type of audio output. In certain example embodiments, a content streaming device may be configured to communicate with a display device, such as a television. Content streaming devices may be media streaming or media output devices configured to facilitate streaming of remotely stored content and/or presentation of locally stored content.

In certain example embodiments, a user may interact with a content streaming device by providing analog sound input (e.g., voice) to a remote control or other devices (e.g., smartphone, etc.) coupled to the content streaming device. The remote control may generate digital voice data representative of the analog sound input and send the voice data to the content streaming device over a wired or wireless communication protocol. The content streaming device may receive the voice data and may generate one or more user interfaces for presentation on a display device, such as a television, that is in communication with the content streaming device. The content streaming device may also send the voice data to one or more remote servers for processing of the voice data to determine a meaning of the sound input, in one example The content streaming device may determine whether the voice data includes a trigger word. A trigger word may indicate that the voice data includes a certain type of request, and/or is to be processed in a specific manner. For example, a trigger word may be "Alexa" and may indicate that the voice data includes a verbal query, and/or that the voice data is to be processed as a verbal query as opposed to, for example, a search request. In some embodiments, the content streaming device may receive an indication of whether the voice data included a trigger word from the one or more remote servers, rather than making the determination at the content streaming device. In certain implementations, the content streaming device may have an expression detector that analyzes an audio signal produced by a microphone of the remote control to detect the wakeword, which generally may be a predefined word, phrase, or other sounds. Such an expression detector may be implemented using keyword spotting technology, as an example. A keyword spotter is a functional component or algorithm that evaluates an audio signal to detect the presence of a predefined word or expression in the audio signal. Rather than producing a transcription of the words of the speech, a keyword spotter generates a true/false output to indicate whether or not the predefined word or expression was represented in the audio signal.

In certain embodiments, an expression detector of an audio device, content streaming device, and/or remote control may be configured to analyze the audio signal to produce a score indicating a likelihood that the wakeword is represented in the audio signal. The expression detector then compares the score to a threshold to determine whether the wakeword will be declared as having been spoken.

In some cases, a keyword spotter may use simplified ASR (automatic speech recognition) techniques. For example, an expression detector may use a Hidden Markov Model (HMM) recognizer that performs acoustic modeling of the audio signal and compares the HMM model of the audio signal to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine (SVM) classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression. Upon declaring that the audio signal represents an utterance of the trigger expression, the content streaming device begins transmitting the audio signal to the remote, network-based speech recognition system for detecting and responding to subsequent user utterances.

In another example, the content streaming device may determine that the voice data does not include a trigger word, and as a result, the voice data is to be processed in a certain manner. For example, voice data without a trigger word may be processed as a search request, such as a search request for media content, as opposed to a verbal query or information request. Depending on whether the voice data is a voice search or a verbal query, the content streaming device may generate different user interfaces, as well as transition from a first set of user interfaces, for example for voice searching, to a second set of user interfaces, for example, for verbal queries. For example, user interfaces generated by the content streaming device may include pre-listen information that may include visual, and/or audio instructions to a user to provide voice data, visual feedback to indicate that voice data is being detected, and/or received, requested information or search results, and other information. Embodiments of the disclosure may generate user interfaces that maintain a look and feel of a user interface theme in transitioning between sets of user interfaces.

Referring to FIG. 1, an overview of an example system 100 in accordance with one or more embodiments of the disclosure is depicted. The system 100 may include a display device 102 in communication with a content streaming device 104. A remote control device 106 may be configured to wirelessly communicate with the content streaming device 104. For example, the remote control device 106 may be connected to the content streaming device 104 or to another device via a Bluetooth, WiFi Direct, and/or other suitable protocol for exchanging information between two devices. In some embodiments, the remote control device 106 may communicate to a cloud or remote server, and the cloud or remote server may determine or identify a computer system or content streaming device that is associated with the remote control device 106 at the time of the communication. For example, the remote server may make a determination based at least in part on proximity or keyword/phrase (e.g., "living room TV") spoken at the remote control device 106. In certain embodiments, a keyword/phrase can be spoken with a verbal command (e.g., "show weather on living room TV") or separately (e.g., context from prior interactions, such as "pair with living room TV").

The content streaming device 104 may be communicatively coupled to the display device 102. For example, the content streaming device 104 may be removably coupled to the display device 102. The display device may be a television, a computer monitor, or any other suitable display device. In certain example embodiments, the display of the display device may be significantly larger in size than the typical display size of a handheld mobile device, such as a smartphone or tablet. The content streaming device 104 may be connected to the display device 102 via any suitable interface, such as, for example, a Universal Serial Bus (USB) interface, a High-Definition Multimedia Interface (HDMI), or the like.

A user 112 may desire to consume digital content using the content streaming device 104. Content, as used herein, may include any type of content that exists in the form of digital data and which is capable of being consumed. Example types of digital content may include, without limitation, electronic books or other electronic publications, Internet content, audio content, video content, or the like. Content may include text content, graphical content, audio content, video content, or the like, and may include information that is broadcast, streamed, or contained in computer files stored on a device configured to render the content.

The remote control device 106 may include one or more buttons 108 and a microphone button 110 that activates a microphone associated with the remote control device 106. The user 112 may utilize the remote control device 106 to interact with the content streaming device 104. For example, the user 112 may utilize the remote control device 106 to navigate between selectable elements on a user interface presented at the display device 102. The remote control device 106 may be a physical standalone remote control. Alternatively, the remote control device 106 may be a smartphone, tablet, or similar device having a remote control application executing thereon. The remote control device 106 may communicate with the content streaming device 104 using any suitable communication technology or protocol including, but not limited to, Bluetooth, NFC, Wi-Fi Direct, infrared (IR), or the like. The remote control device 106 may include, for example, 5-way cursor controls to enable navigation in four orthogonal directions as well as to enable a selection action equivalent to a tap or click in a touch interface or click interface, respectively. The 5-way cursor controls may be a physical directional pad that includes four directional buttons, and a center button or may be provided as part of a touch interface.

In certain example embodiments, when the user 112 selects a particular button of the remote control device 106, a signal may be generated and communicated to the content streaming device 104. Upon receipt of the signal, the content streaming device 104 may generate a first event indicative of a first device operation associated with the selected button. For example, for a selection of a right directional button, the first device operation may correspond to navigation in a direction to the right between user interface representations of content items in a carousel. Buttons may generate different signals based, at least in part, on a length of time a respective button is held or depressed. For example, the mic button 110 may generate a first signal when the mic button 110 is tapped or pressed for a relatively short length of time, and a second signal when the mic button 110 is pressed and held for a relatively long or predetermined length of time. A tap or press of the mic button 110 may cause the content streaming device 104 to enter a pre-listen state, while a longer press and hold of the mic button 110 may cause the content streaming device 104 to enter a listen state.

In the illustration of FIG. 1, the user 112 may select the mic button 110 by pressing and holding the mic button 110 to indicate a user selection 114 of the mic button. The mic button 110 may generate and send a signal to the content streaming device 104. Upon receiving the signal, the content streaming device 104 may enter a listen state. A listen state may indicate that the content streaming device 104 is monitoring (e.g., at a local receiver or voice server) for voice data. Monitoring may include actively looking for data at one or more receivers or local servers or communication channels. Monitoring may be constant or periodic. The user 112 may communicate voice data 116 to the content streaming device 104 via a microphone of the remote control device 106. For example, while pressing and holding the mic button 110, the user 112 may speak, and the microphone of the remote control device 106 may receive analog sound input, and generate voice data 116 representative of the analog sound input. The remote control device 106 may send or relay the voice data 116 to the content streaming device 104 over a wireless connection. In some instances, the remote control device 106 may send the voice data 116 to the content streaming device 104 as the voice data is generated, and/or as the analog sound input is received.

The content streaming device 104 may receive the voice data 116 from the remote control device 106. While the content streaming device 104 is receiving the voice data 116, the content streaming device 104 may generate a user interface 118 indicating that the content streaming device 104 is receiving voice data, so as to indicate to the user 112 that the voice data is being received. For example, the content streaming device 104 may generate the user interface 118 on a display of the display device 102 with visual feedback, such as an indication of voice modulation, as shown in FIG. 1, to indicate to the user 112 that voice data is being received, and/or that the content streaming device 104 is in a "listen" state (e.g., that the content streaming device 104 is listening). The user interface 118 may include visual feedback, such as the illustrated voice modulation, that is overlayed on top of previously presented information. For example, the visual feedback may be overlayed on top of a home screen user interface that was previously presented at the display device 102.

Upon receiving the voice data 116, the content streaming device 104 may determine whether the voice data 116 includes a trigger word at determination block 120. In some embodiments, the content streaming device 104 may send the voice data to one or more remote servers for voice processing, while in other embodiments, the content streaming device 104 may locally process the voice data 116 to determine whether the voice data includes a trigger word. For example, the content streaming device 104 may send the voice data 116 to one or more remote servers for voice processing. The one or more remote servers may receive the voice data and process the voice data to determine words or phrases included in the voice data, and in some instances, a meaning of the voice data. The one or more remote servers may determine whether the voice data includes a trigger word, and may send an indication of whether the voice data includes a trigger word to the content streaming device 104.

A trigger word may be a word of a set of one or more trigger words that indicate a type of request included in the voice data 116. Example types of requests, as described herein, may include search requests, such as content search requests, verbal queries, such as requests for information, including weather, news, and other information, and the like. Trigger words may be identified by comparing one or more words of the voice data 116 to a table, including the set of one or more trigger words. Identification of trigger words may be performed locally at the content streaming device 104 in some embodiments, while in other embodiments, the content streaming device 104 may receive an indication that the voice data 116 included a trigger word, such as from one or more remote servers. In some embodiments, positioning or arrangement of words in the voice data may be used in determining whether the voice data includes a trigger word. For example, in some embodiments, if the first character or word of the voice data is not a trigger word, the voice data may be considered or determined to not include a trigger word.

If it is determined that the voice data 116 includes a trigger word, the content streaming device 104 may generate a first type of user interface 130 at the display device 102. In some embodiments, the content streaming device 104 may receive an indication from the one or more remote servers that indicates the voice data 116 includes a trigger word. Upon receiving the indication from the one or more remote servers, the content streaming device 104 may initiate the first type of user interface 130, which may be associated with a particular user interface theme or user interface mode. In one example, the first user interface type 130 may be associated with a virtual assistant user interface theme. Virtual assistant user interface themes may include a set of one or more cards instead of, or in addition to, a list. Cards may include information that can be presented in succession or upon command. Cards may include information in specific blocks or formatting. The first type of user interface 130 may be based, at least in part, on a first set of user interfaces that may include certain information, formatting, themes, styles, or other attributes. In some embodiments, the first type of user interface 130 may be selected from a stack or a set of one or more user interfaces. In some embodiments, the first type of user interface 130 may be associated with audio information in addition to visual information. In the example of FIG. 1, presence of a trigger word may indicate that the voice data is a verbal query for information. For example, a verbal query may include a request for information (e.g., news, weather, etc.), a request for certain content, a conversational request which may indicate natural language processing is to be performed on the voice data, and other requests. If the content streaming device 104 determines that the voice data 116 includes a trigger word, the content streaming device 104 may generate a first user interface 132 that may include information related to the verbal query, and may also include an audio response 134. For example, if the user 112 requested local news, the content streaming device 104 may generate the first user interface 132 with information identifying a news source (e.g., NPR), a title (e.g., "Latest NPR Hourly News Update"), and other information. The content streaming device 104 may further initiate the audio response 134 to the verbal query, which may include an audible newscast or audible transcription of news.

If the content streaming device 104 determines that there is or was no trigger word in the voice data 116, the content streaming device 104 may determine that the voice data does not include a verbal request, or that the voice data is a different type of request. In response to the determination, the content streaming device 104 may generate a second type of user interface 140 at the display device 102. The second type of user interface 140 may be a default user interface or may be selected from a second set of user interfaces, and may be associated with a particular user interface theme or user interface mode. In one example, the first user interface type 130 may be associated with a voice search user interface theme. A voice search user interface theme may include a list of one or more options, such as text options or characters that may include titles, names, descriptions, and the like. Lists may be presented at a single user interface, such as a scrollable user interface that lists one or more options. For example, the content streaming device 104 may consider all voice data without a trigger word to be a certain type of request, such as a voice search, and may treat all such voice data accordingly. In FIG. 1, if the content streaming device 104 determines that there was no trigger word in the voice data 116, the content streaming device 104 may consider the voice data to be a voice search and may generate a second user interface 142 in accordance with a voice search. For example, the second user interface 142 may present a set of one or more candidate search options or search strings that are selectable by the user 112 to perform a search, such as a content search. The set of one or more candidate search options may be overlayed on top of a previously presented user interface, as shown in FIG. 1. The user 112 may select one of the presented candidate search options to initiate a content search for the selected search option. In some embodiments, upon receiving the voice data initiation signal from the remote control, the content streaming device 104 may initiate the second type of user interface 140, and then may initiate the first type of user interface 130 upon receiving the indication that the voice data includes a trigger word from the one or more remote servers. In some embodiments, an incoming voice data indication or a voice data initiation signal may be generated by a push-to-talk button at an electronic device, and/or a wake word, or trigger word preconfigured into an "always-listening" microphone-based device. In such embodiments, detection of the trigger word may result in the voice data initiation signal except when muted, turned off, or otherwise instructed not to listen. For example, "always-listening" devices may include a trigger word unique to device, and not the server. Certain embodiments may include two or more trigger words (e.g., first trigger word for device, and second trigger word for virtual assistant).

The systems, methods, computer-readable media, techniques, and methodologies for dynamic voice search transitioning may facilitate efficient conveyance of information to users via user interfaces that may include information indicating an operating state of a content streaming device, a processing state of a content streaming device, how voice data is being processed by a content streaming device, and other indications of voice processing. Embodiments of the disclosure may further transition from a first type of user interface for a certain type of voice request to a second type of user interface for a second type of voice request while maintaining a look and feel of the user interface.

Example embodiments of the disclosure, provide a number of technical features or technical effects. For example, in accordance with example embodiments of the disclosure, certain user interfaces are selected, and/or generated in response to certain types of voice requests. For example, a voice search request may trigger presentation of a first type of user interface, while a verbal query may trigger presentation of a second type of user interface. A type of voice data may be determined by the presence of a trigger word in the voice request in some embodiments. The above examples of technical features, and/or technical effects of example embodiments of the disclosure are merely illustrative, and not exhaustive.

One or more illustrative embodiments of the disclosure have been described above. The above-described embodiments are merely illustrative of the scope of this disclosure, and are not intended to be limiting in any way. Accordingly, variations, modifications, and equivalents of embodiments disclosed herein are also within the scope of this disclosure. The above-described embodiments and additional, and/or alternative embodiments of the disclosure will be described in detail hereinafter through reference to the accompanying drawings.

Illustrative Process and Use Cases

Figure 2A:
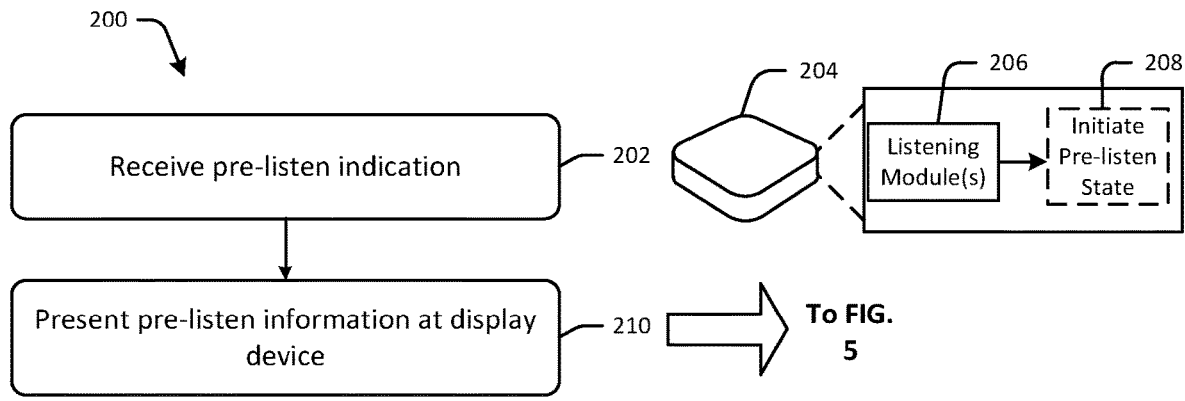
FIGS. 2A-2B are schematic illustrations of an example process flow for dynamic voice search processing in accordance with one or more example embodiments of the disclosure.
Figure 2B:
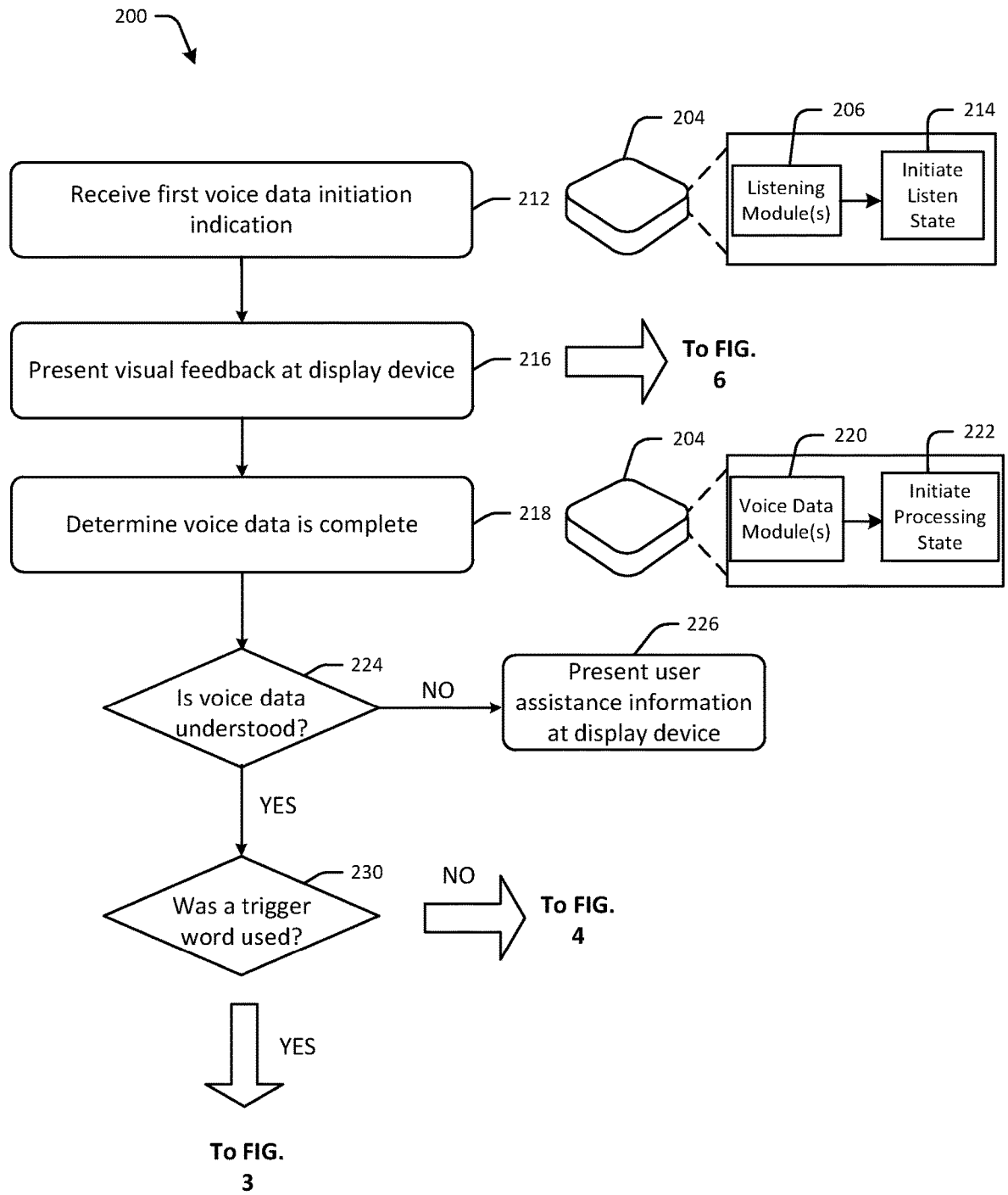
Figure 3:
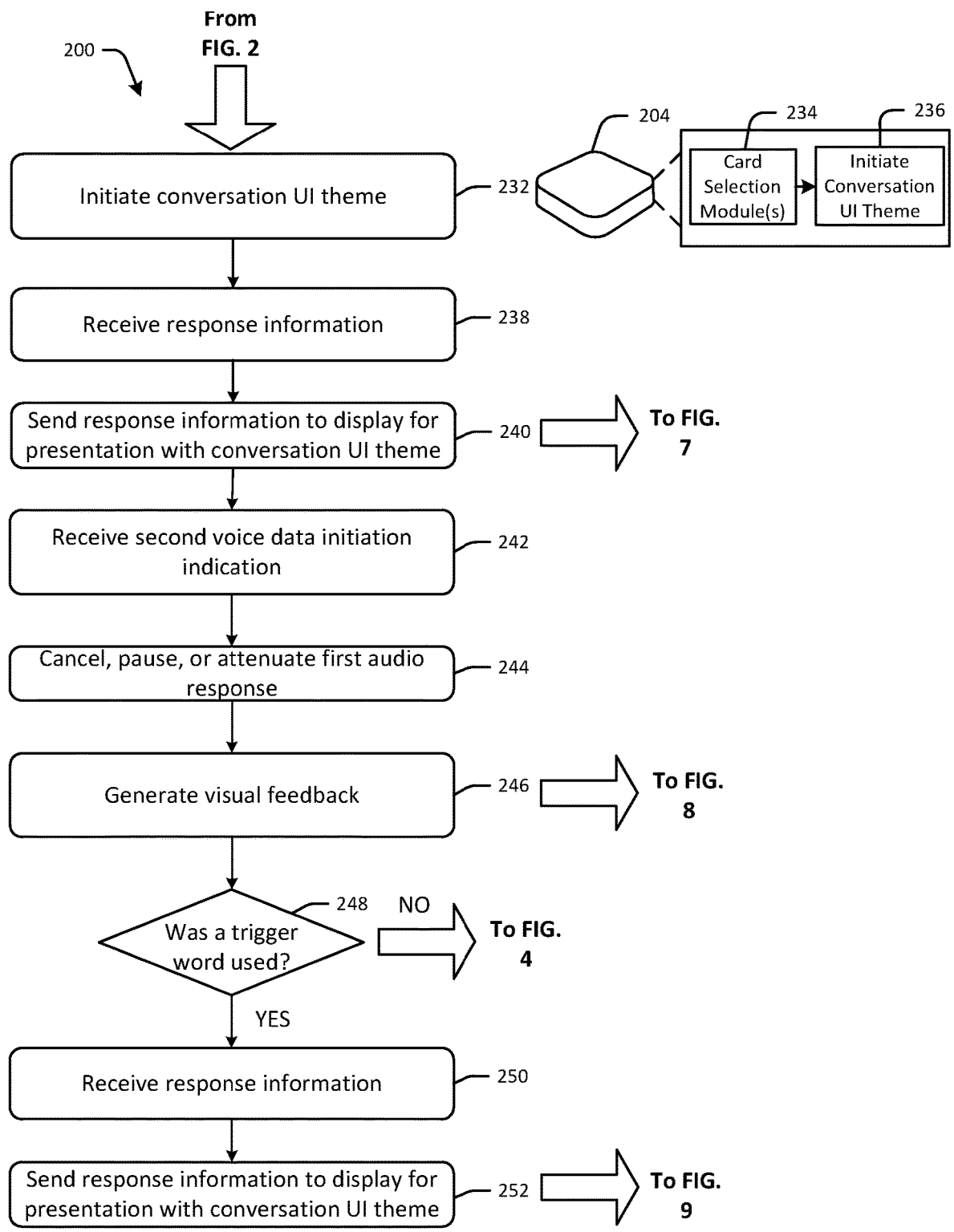
FIGS. 3-4 are schematic illustrations of example process flows for dynamic voice search transitioning in accordance with one or more example embodiments of the disclosure.
Figure 4:
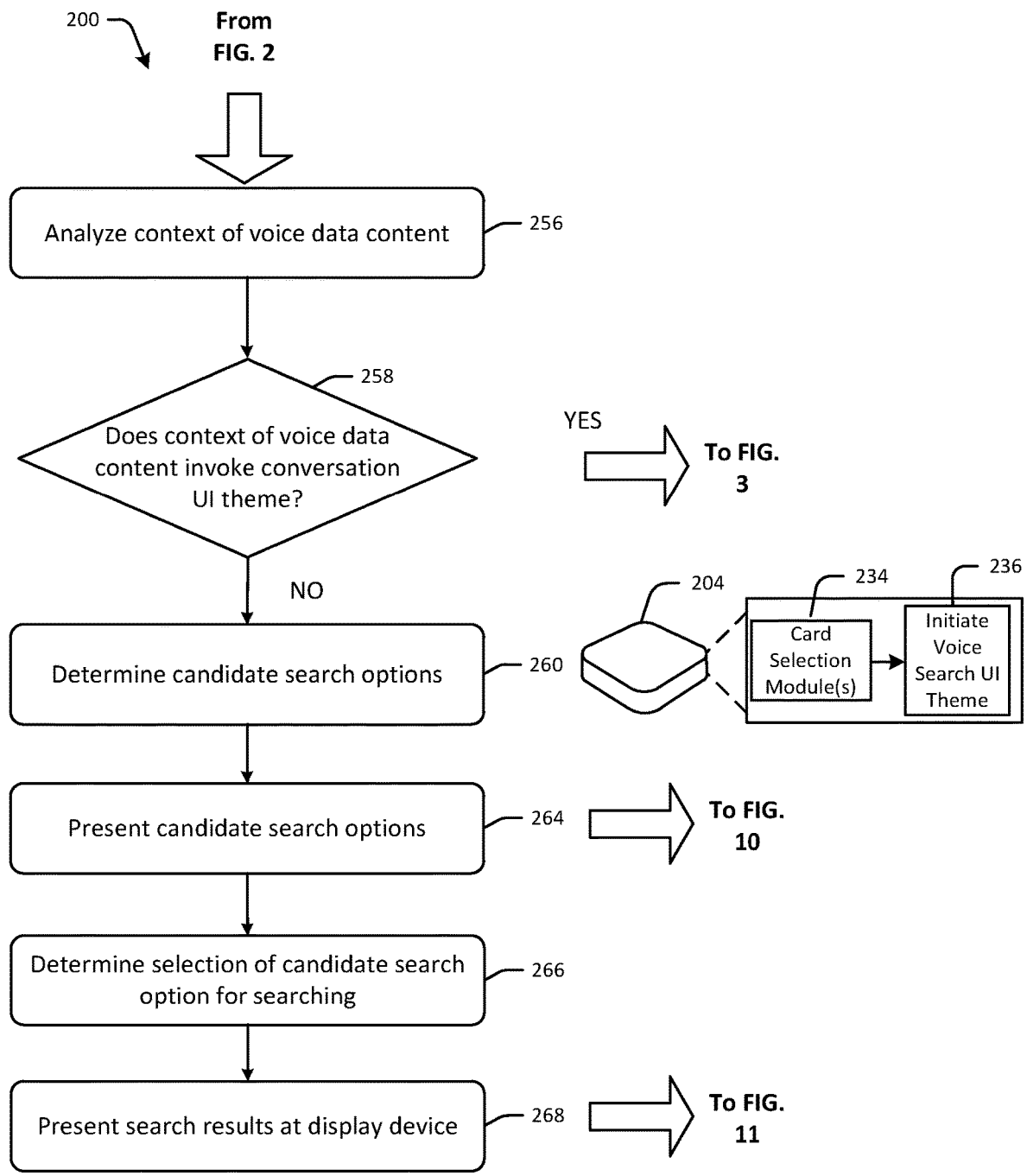

FIGS. 2-4 depict an example process flow 200 for dynamic voice search transitioning in accordance with one or more embodiments of the disclosure, and will be discussed in conjunction with FIGS. 5-12, which depict example user interfaces in accordance with one or more embodiments of the disclosure. Referring first to FIG. 2, FIG. 2 depicts the process flow 200 and a content streaming device 204. The content streaming device 204 may be the same as, or different than, the content streaming device 104 of FIG. 1. While example embodiments of the disclosure may be described in the context of content streaming devices, it should be appreciated that the disclosure is more broadly applicable to any user device configured to generate user interfaces.

The content streaming device 204 may be any computing device with one or more processors, and at least one memory communicatively coupled to the one or more processors. The content streaming device 204 may be able to receive, and transmit or send information via wired or wireless communication, for example, to and from a remote control device, a display device, and/or one or more remote server(s). In some embodiments, the content streaming device 204 may be a media streaming device configured to stream content, such as audio or visual content. In such embodiments, streaming of content may include receiving data packets and, in some instances, storing the data packets in a local buffer. The data packets received may be decoded, and output as content for consumption. Accordingly, the content streaming device 204 may begin output of content before receiving an entirety of content data. In some embodiments, the content streaming device 204 may be configured to output streamed media content locally, and/or at a connected device. Examples of content streams include, but are not limited to, visual content streaming such as movies, television shows, and other video content, as well as audio content streaming, such as music, audio books, and other audio content.

At block 202 of the process flow 200 in FIG. 2, the content streaming device 204 may receive a pre-listen indication. The content streaming device 204 may receive the pre-listen indication from, for example, a remote control device, a smartphone, a tablet, or another device wirelessly coupled to the content streaming device. In one example, the content streaming device 204 may receive a pre-listen indication from a remote control device. The pre-listen indication may be generated by the remote control device by a tap or a press-and-release of a mic button, or another gesture, of the remote control device. Upon receiving the pre-listen indication, the content streaming device 204 may enter a pre-listen state, in which the content streaming device 204 prepares to listen or monitor for voice data. For example, computer-executable instructions of a listening module(s) 206 stored on a memory of the content streaming device 204 may be executed to initiate a pre-listen state 208. Monitoring for voice data may occur at one or more local receivers or voice servers, for example.

Figure 5:
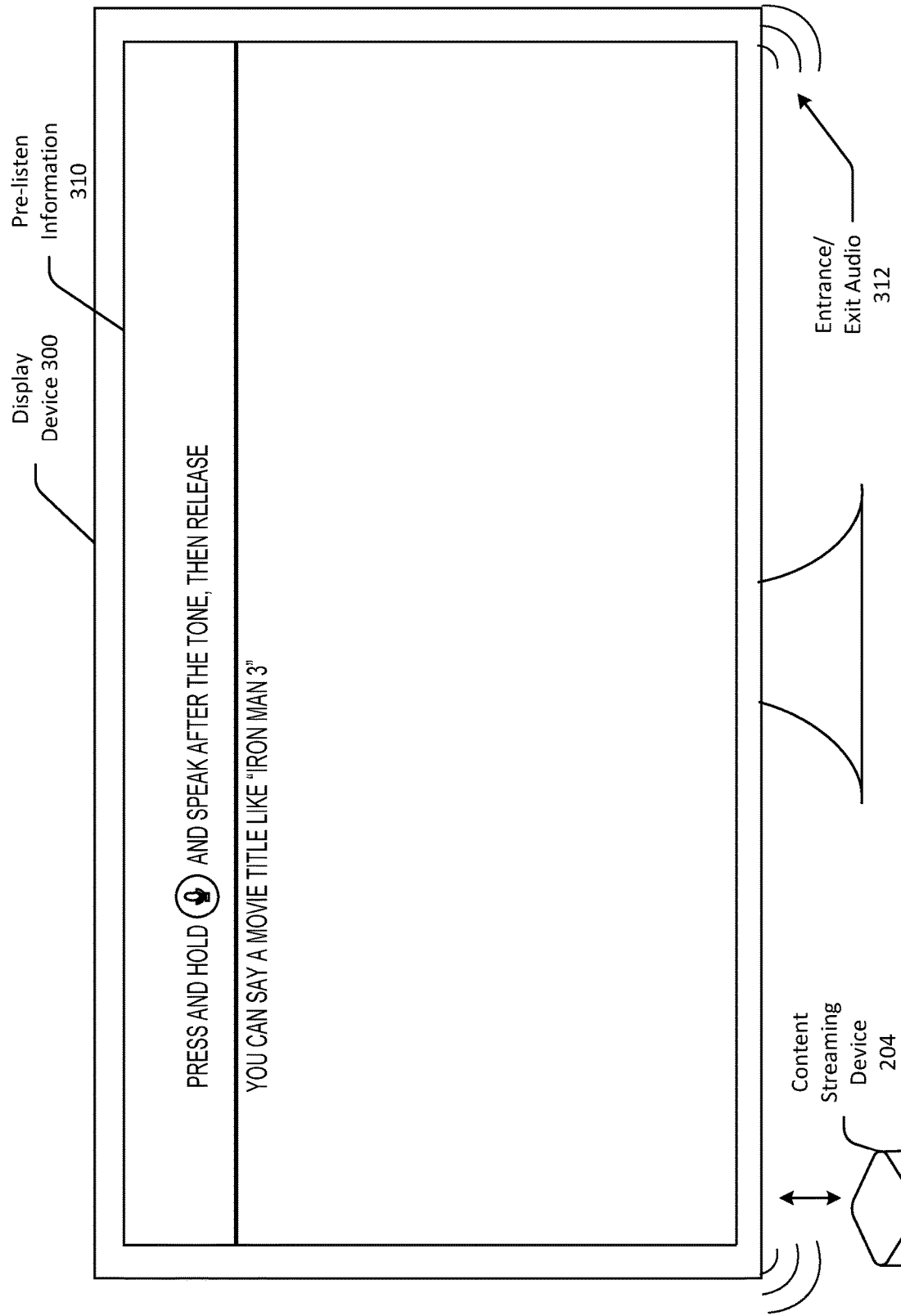
FIG. 5 is a schematic illustration of an example user interface presenting pre-listen information in accordance with one or more example embodiments of the disclosure.

At block 210 of the process flow 200, computer-executable instructions of one or more module(s) stored on a memory of the content streaming device 204 may be executed to present pre-listen information at a display device. For example, with reference to FIG. 5, upon receiving the pre-listen indication, the content streaming device 204 may generate a user interface with pre-listen information 310 for presentation at a display device 300. The pre-listen information 310 may include information such as visual or audible user instructions, hints, and the like. For example, the pre-listen information 310 may inform the user how to perform a voice search or a verbal query, or how to send voice data to the content streaming device 204. In some instances, the pre-listen information 310 may include error messages or other indicators of problems or errors with voice data. In the illustration of FIG. 5, the pre-listen information 310 may inform the user that voice data can be sent to the content streaming device 204 by pressing and holding a mic button on the remote control device.

A user may view or consume the pre-listen information 310, and may press and hold a mic button on the remote control device to begin voice data communication with the content streaming device 204. For example, the remote control device may include one or more microphones configured to generate signals based at least in part on incident or ambient sounds. In certain example embodiments, the remote control device may include a microphone configured to receive sound input in the form of analog sound, and may generate electrical signals indicative of the analog sound. Processing circuitry of the remote control device may convert the analog sound to digital voice data using an analog-to-digital converter (ADC). The remote control device may utilize the ADC to generate digital voice data from the analog sound input, and may send the voice data to the content streaming device 204 in accordance with a suitable communication protocol including, for example, a local area network (LAN) wireless communication protocol such as Wi-Fi, Wi-Fi Direct, or a personal area network (PAN) such as Bluetooth™, or another wireless communication protocol as described herein.

At block 212, the content streaming device 204 may receive a first voice data initiation indication. For example, upon determining that the user has pressed and held the mic button for a predetermined or threshold length of time, the remote control device may send a voice data initiation indication to the content streaming device 204. The content streaming device 204 may receive the voice initiation indication, which may indicate that voice data transmission will commence, and the content streaming device 204 may enter a listening state in which the content streaming device 204 monitors for voice data. For example, computer-executable instructions of the listening module(s) 206 stored on a memory of the content streaming device 204 may be executed to initiate a listen state 214. The content streaming device 204 may monitor for voice data to be received.

Figure 6:
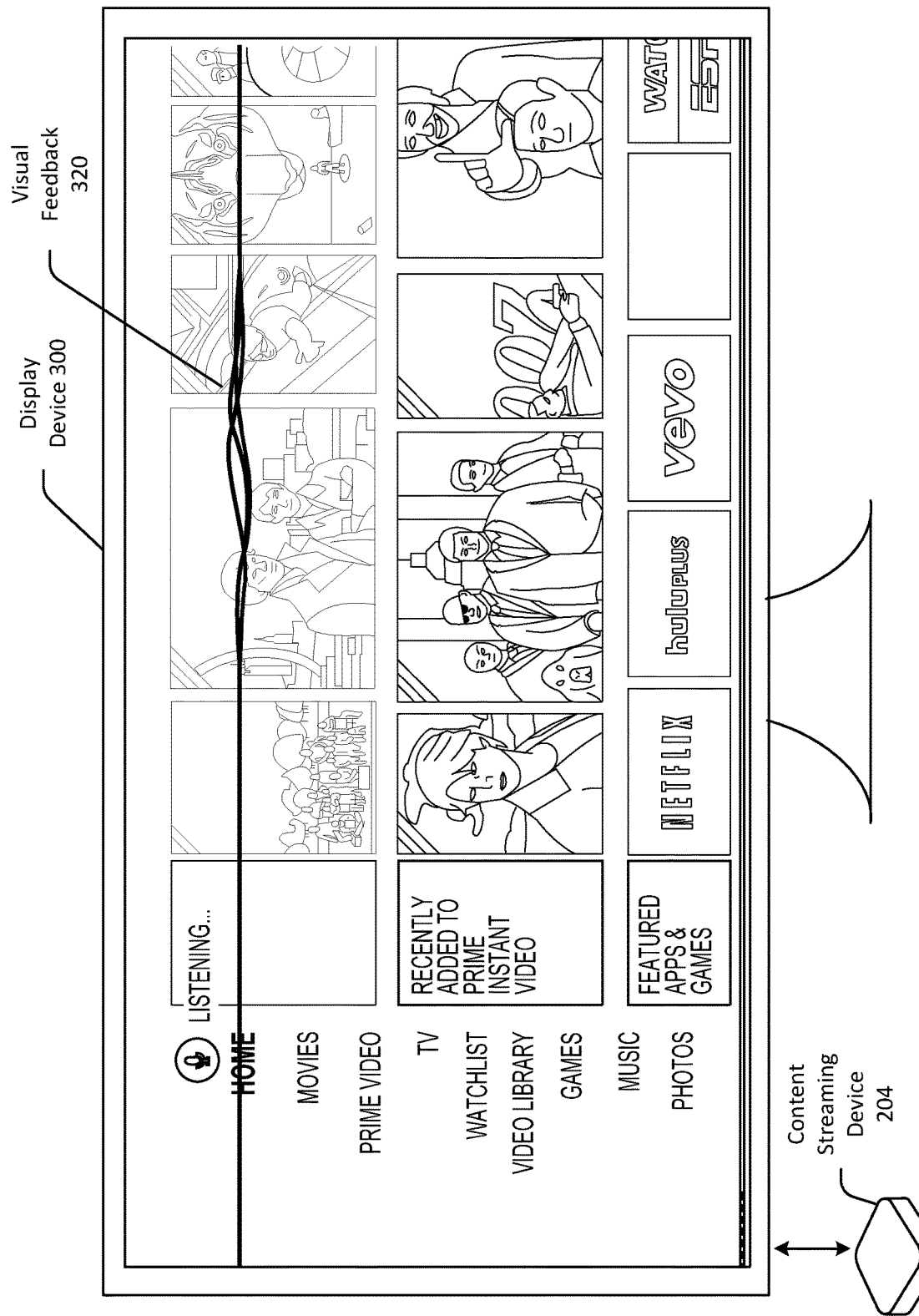
FIG. 6 is a schematic illustration of an example user interface presenting visual feedback in accordance with one or more example embodiments of the disclosure.

At block 216 of the process flow 200, computer-executable instructions of one or more module(s) stored on a memory of the content streaming device 204 may be executed to present visual feedback at a display device. For example, with reference to FIG. 6, the content streaming device 204 may generate a user interface with an onscreen element of visual feedback 320 at the display device 300. The visual feedback 320 may be in the form of voice modulation, as shown in FIG. 6, or any other suitable form to indicate that voice data is being detected, and/or received by the content streaming device 204. In some instances, such as voice modulation, the visual feedback 320 may be representative of the voice data as the voice data is being received or detected. In some embodiments, the visual feedback 320 may be overlayed on top of previous user interface, while in other embodiments, the visual feedback 320 may be standalone. The visual feedback 320 may include text, graphics, and other indicators to communicate or indicate to the user that voice is being detected, and/or voice data is being received, and/or that the content streaming device 204 is listening.

At block 218 of the process flow 200, computer-executable instructions of one or more module(s) stored on a memory of the content streaming device 204 may be executed to determine that voice data is complete. For example, upon release of the mic button on the remote control device, the remote control device may send a signal to the content streaming device 204 an indication that the voice data is complete. In another example, the content streaming device 204 may determine that the voice data is complete after a predetermined length of time has passed, and there has been silence or relative silence.

Upon determining that the voice data is complete, the content streaming device 204 may enter a processing state. For example, computer-executable instructions of a voice data module(s) 220 stored on a memory of the content streaming device 204 may be executed to initiate a processing state 222. In the processing state 222, the content streaming device 204 may process the voice data to determine a meaning of the voice data. In some embodiments, the content streaming voice 204 may process the voice data locally, while in other embodiments, the content streaming device 204 may send the voice data to one or more remote servers for processing. Processing may include natural language processing (or other speech recognition processing)

on the voice data to determine a meaning of the corresponding sound input detected by the microphone. Processing the voice data may include generating speech-to-text translations of the data. In some embodiments, transmission of the voice data by the content streaming device 204 may begin when initial voice data is received by the content streaming device 204, before an entirety of the voice data is received. In such embodiments, processing time at the one or more remotes servers may be reduced.

At determination block 224 of the process flow 200, computer-executable instructions of one or more module(s) stored on a memory of the content streaming device 204 may be executed to determine whether the voice data is understood. The determination of whether the voice data is understood may be based, at least in part, on the results of the processing of the voice data. If the results of the processing indicate that the voice data was not deciphered, a determination may be made that the voice data is not understood. If the results of the processing indicate that the voice data is deciphered, a determination may be made that the voice data is understood.

If it is determined that the voice data was not understood, the process flow 200 may continue to block 226 at which user assistance information is presented at the display device. For example, computer-executable instructions of one or more module(s) stored on a memory of the content streaming device 204 may be executed to generate a user interface with user assistance information for presentation at the display device. In some instances, the user assistance information may be presented at the same or at a user interface similar to the user interface with the pre-listen information (such as that shown in FIG. 5), with an error message or other indication that the voice data was not understood. The user interface may further include detailed user assistance information, such as how long to hold down the mic button for, instructions to speak louder or more clearly, and the like. Upon presenting the user assistance information, the content streaming device 204 may return to the pre-listen state at block 228 and may await voice data or a voice data initiation indication.

If it is determined that the voice data was understood at determination block 224, the process flow 200 may continue to determination block 230. At determination block 230, computer-executable instructions of one or more module(s) stored on a memory of the content streaming device 204 may be executed to determine whether the voice data includes a trigger word. A trigger word may be a word, character, or sound that indicates how particular voice data is to be processed. For example, a trigger word may indicate that voice data is a verbal query, and/or should be processed as conversational data instead of a content search. In addition, depending on how voice data is processed, the content streaming device 204 may generate different user interfaces. For example, a first set of user interfaces may be generated for verbal queries or conversational requests, while a second set of user interfaces may be generated for voice searches. In some embodiments, trigger words may be found at certain instances of the voice data, such as at a first word, a last word, or at another position within the voice data. The determination of whether the voice data includes a trigger word may be made at the content streaming device 204 or at a remote server, which may send an indication of whether the voice data includes a trigger word to the content streaming device 204. In one example, some or all of the words in the voice data may be compared to a table of a set of one or more trigger words to determine whether the voice data includes a trigger word.

If it is determined that the voice data includes a trigger word, the process flow 200 may continue to FIG. 3. If it is determined that the voice data does not include a trigger word, the process flow may continue to FIG. 4. Referring first to FIG. 3, at block 232, the content streaming device 204 may determine that a trigger word was used. Upon determining that the voice data includes a trigger word, the content streaming device 204 may initiate a first set of user interfaces. For example, computer-executable instructions of a card selection module(s) 234 stored on a memory of the content streaming device 204 may be executed to initiate one or more conversation card(s) presented with a conversation UI theme 236. Conversation cards may be user interfaces generated in response to conversational requests or verbal queries from a user, and may be different than other user interfaces such as, for example, voice search user interfaces. In some embodiments, cards may be implemented using a template-based data structure in which a remote server (e.g., a cloud server, etc.) sends data to fill a template of the card with an indication of a particular template to use. Templates may be selected from any number of templates, and a receiving device may generate the card with the particular template. The generated card may be filled with data and presented for consumption in some embodiments.

At block 238 of the process flow 200, computer-executable instructions of one or more module(s) stored on a memory of the content streaming device 204 may be executed to determine a response to the voice data, or to receive response information (e.g., from one or more remote servers). For example, upon processing of the voice data, the content streaming device 204 may determine that the voice data includes a verbal query or request for information related to news, traffic, weather, or other information, a request to perform an action (e.g., play a song, etc.), and in response, the content streaming device 204 may determine the requested information, and/or determine an appropriate response. In some embodiments, the content streaming device 204 may determine responses to voice data locally, while in other embodiments, the content streaming device 204 may receive an indication of responses from one or more remote servers.

Figure 7:
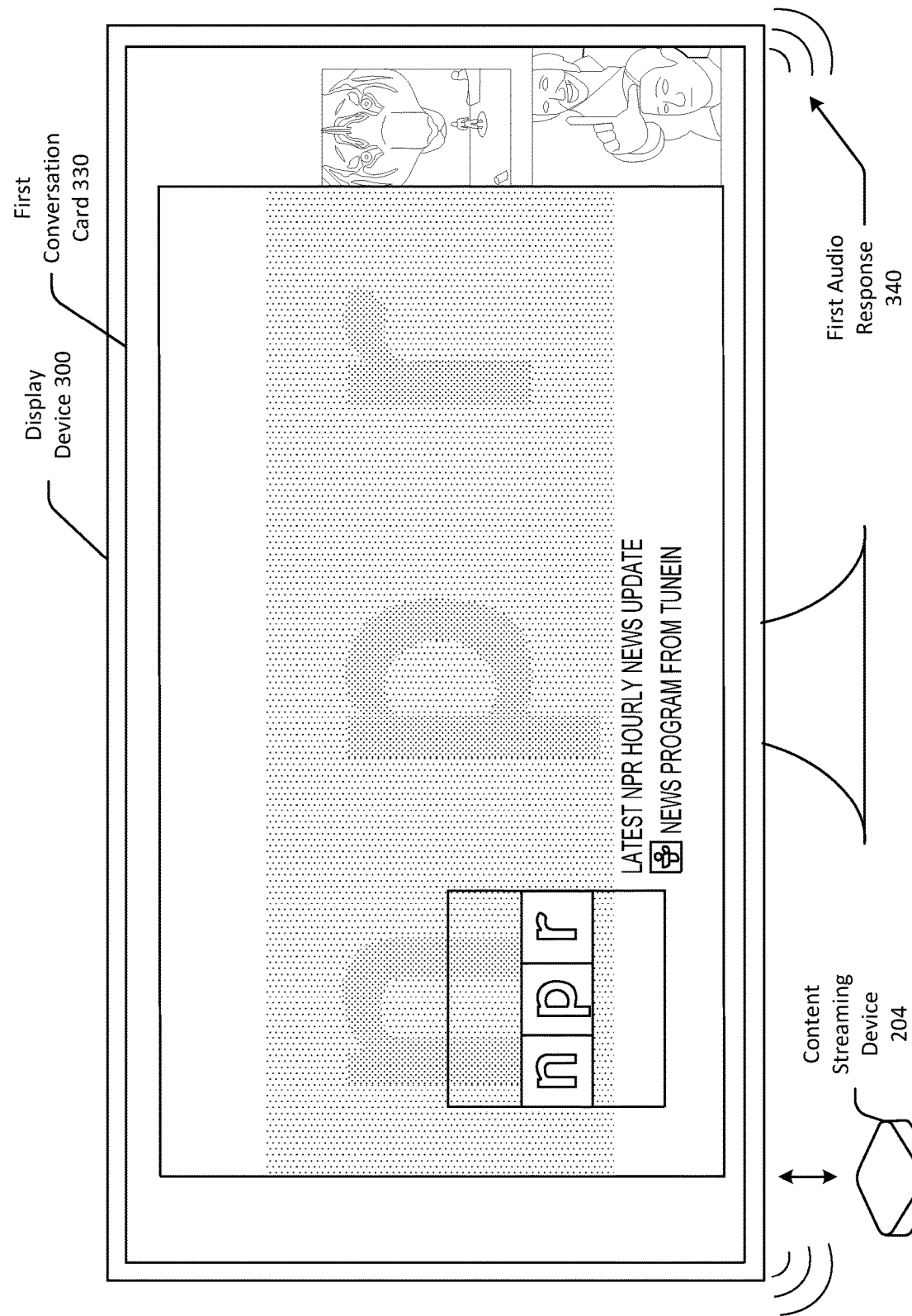
FIGS. 7-9 are schematic illustrations of example user interfaces presenting conversation card information in accordance with one or more example embodiments of the disclosure.

At block 240 of the process flow 200, response information may be sent to a display for presentation with the conversation UI theme. For example, with reference to FIG. 7, computer-executable instructions of one or more module(s) stored on a memory of the content streaming device 204 may be executed to determine first information in response to the first verbal request of the first voice data, and to generate a first user interface or first conversation card 330 for presentation at the display device 300. The first conversation card 330 may be a user interface that communicates to the user that the voice data was processed as a verbal query and may present information relevant to the verbal query. For example, the first conversation card 330 may include a description of audio that is being presented to a user, title or author information, and other information. User interfaces generated by the content streaming device 204, such as conversation cards, and/or voice search cards, may include various selectable onscreen elements such as buttons, icons, menus, and so forth. Depending on the verbal query or meaning of the voice data, the content streaming device 204 may further initiate a first audio response 340 at, for example, a speaker of the display device 300 in addition to the first conversation card 330. The first audio response 340 may be presented at a different speaker that is remote from the display device 300 in some embodiments. Some responses may not include an audio component. In the example of FIG. 7, the content streaming device 204 may begin an audio newscast, and may present related information that may describe the audio on the user interface or first conversation card 330 presented at the display device 300.

In some instances, while the first conversation card 330, and/or the first audio response 340 is being presented, a user may interrupt the content streaming device 204 with a subsequent request or with additional voice data. For example, while listening to the newscast in FIG. 7, the user may desire to be presented with weather information and may interrupt the presentation of the newscast.

In such instances, at block 242 of the process flow 200 in FIG. 3, the content streaming device 204 may receive a second voice data initiation indication, which may be during presentation of the first audio 340. For example, the user may press and hold a mic button on a remote control to send a voice data initiation indication to the content streaming device 204. The content streaming device 204 may receive the second voice data initiation indication, and at block 244 of the process flow 200, the content streaming device 204 may pause or cancel the first audio response that is being presented.

Figure 8:
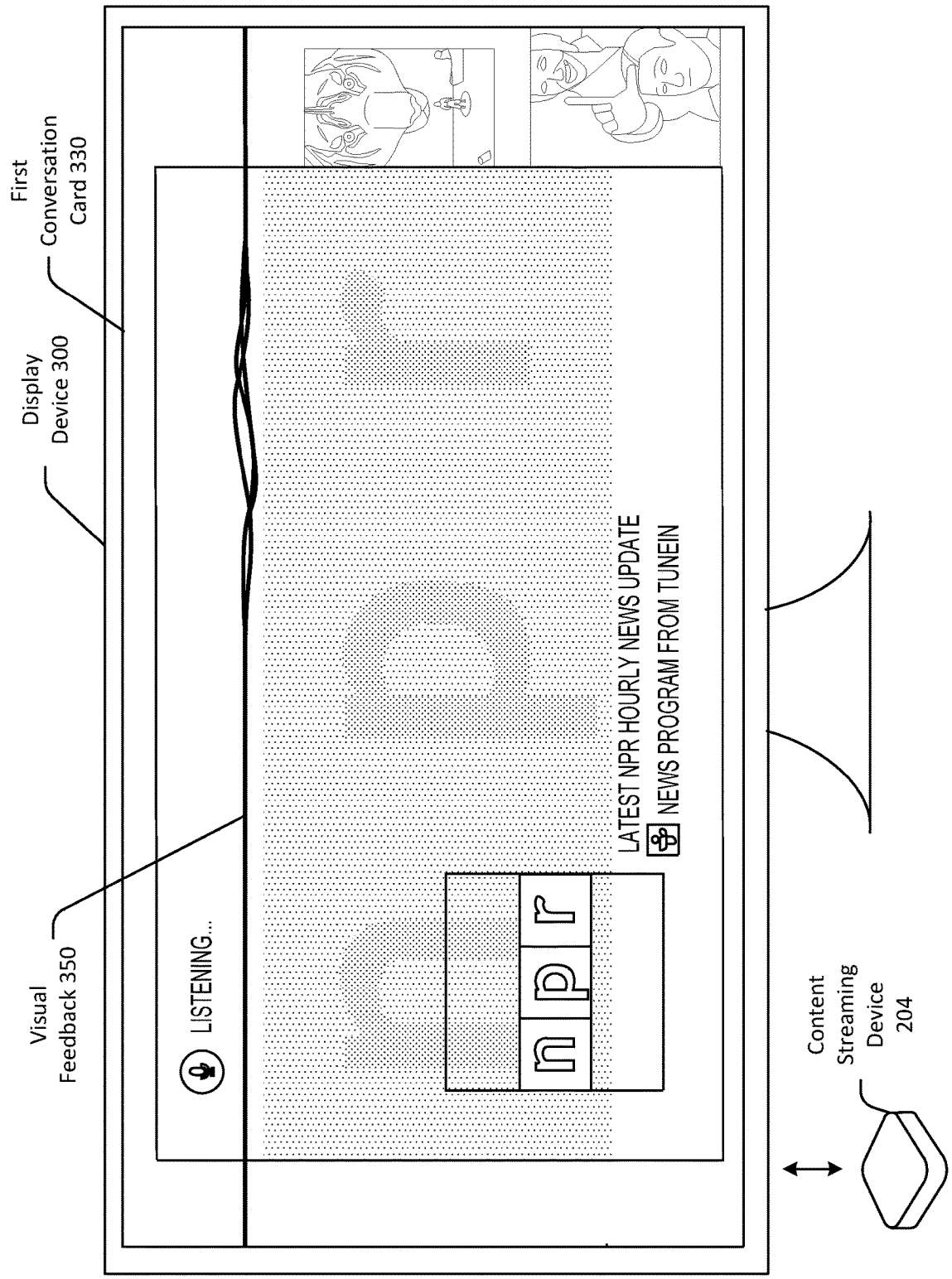
Figure 9:
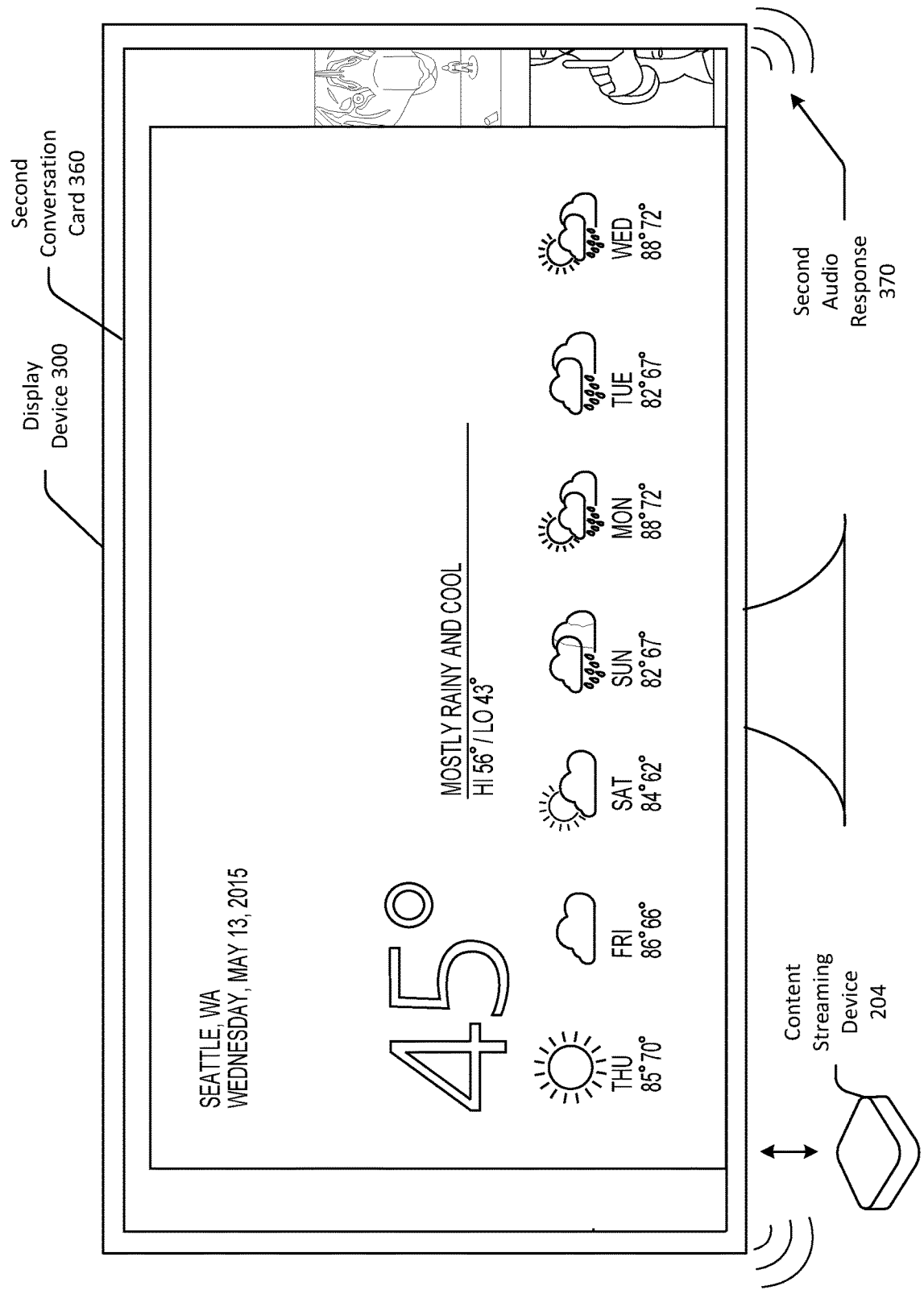

At block 246 of the process flow 200, computer-executable instructions of one or more module(s) stored on a memory of the content streaming device 204 may be executed to present visual feedback over the first conversation card at the display device. For example, with reference to FIG. 8, the content streaming device 204 may generate a user interface with an onscreen element of visual feedback 350 at the display device 300. The visual feedback 350 may be in the form of voice modulation, as shown in FIG. 8, or any other suitable form to indicate that voice data is being detected, and/or received by the content streaming device 204. In some instances, such as voice modulation, the visual feedback 350 may be representative of the voice data as the voice data is being received or detected. In some embodiments, the visual feedback 350 may be overlayed on top of previous user interface, or the first conversation card 330 in the example of FIG. 8. The visual feedback 350 may include text, graphics, and other indicators to communicate or indicate to the user that voice is being detected, and/or voice data is being received, and/or that the content streaming device 350 is listening. The first conversation card 330 may persist or remain presented in the background while the second voice data is being received, and/or while the visual feedback 350 is being presented such that if the second voice data includes an interaction command with an interaction element of the first conversation card 330 (e.g., a selection of a particular selectable onscreen element of the first conversation card 330, etc.), or another multi-term interaction with the first conversation card 330, the first conversation card 330 is readily available. The content streaming device 204 may determine that the conversation card user interface type, or user interface theme was the last used user interface theme, and may initiate the conversation card user interface theme.

Upon completion of the voice data, the process flow 200 may proceed to determination block 248 to determine how the second voice data is to be processed. At determination block 248, computer-executable instructions of one or more module(s) stored on a memory of the content streaming device 204 may again be executed to determine whether the voice data includes a trigger word. If it is determined that the second voice data includes a trigger word, the process flow 200 may continue to block 250. If it is determined that the second voice data does not include a trigger word, the process flow may continue to FIG. 4.

In the event it is determined that the second voice data includes a trigger word, the process flow 200 may continue to block 250. The content streaming device 204 may determine, for example, via voice processing, a request associated with the second voice data, and at block 250, the content streaming device 204 may determine a response to the second voice data. Upon determining a response to the second voice data, the process flow 200 may continue to block 252, at which the content streaming device 204 may present a second audio response, and/or a second user interface. For example, with reference to FIG. 9, the user may interrupt the newscast with a verbal query for weather information. In response, the content streaming device 204 may determine weather information and may present a user interface or a second conversation card 360 with weather information at the display device 300. In some embodiments, where a second audio response is appropriate (e.g., audible version of weather information, etc.), the content streaming device 204 may initiate a second audio response 370 at the display device 300, or at another speaker. For example, the weather forecast may be presented as part of the second audio response 370.

Upon presenting some or all of the second audio response, and/or the second user interface, the process flow 200 may optionally return to, or regenerate, the first conversation card, and/or first audio. For example, after presenting some or all of the weather information, or after presenting some or all of the weather information for a predetermined length of time, the content streaming device 204 may return to the first conversation card 330 of FIG. 7, and/or may resume the audible newscast of the first audio response 340. Alternately, in some instances, such as an instance where a first media content, such as a first movie, is being presented and is interrupted with a request for a second media content, or a different movie, presentation of the first media content, and/or first audio may be canceled instead of, or in addition to, pausing the first audio response.

Referring now to FIG. 4, if it is determined at determination block 230, or at determination block 248 that the voice data does not include a trigger word, the process flow 200 may continue to FIG. 4. In certain embodiments, if voice data does not include a trigger word, the voice data may be processed as a default voice request, which may be a voice search. For example, a user may use a voice-based search function to search for content. The voice-based search function may be initiated at a remote control device by pressing, and holding the mic button, for example.

If it is determined at determination block 230 or 248 that the voice data does not include a trigger word, the process flow 200 may continue to FIG. 4. At block 256 of the process flow 200 in FIG. 4, the content streaming device 204 may determine that the voice data did not include a trigger word. Upon determining that the voice data did not include a trigger word, the content streaming device 204 may initiate a second set of user interfaces. For example, computer-executable instructions of the card selection module(s) 234 stored on a memory of the content streaming device 204 may be executed to initiate one or more voice search card(s) presented with a voice search UI theme 258. Voice search cards may be user interfaces generated in response to voice-based search requests, such as requests for content, from a user, and may be different than other user interfaces such as, for example, conversation cards or user interfaces.

At block 260 of the process flow 200, computer-executable instructions of one or more module(s) stored on a memory of the content streaming device 204 may be executed to determine candidate search options for presentation. For example, the content streaming device 204 may determine a set of candidate search strings based, at least in part, on the second voice data. In some embodiments, the content streaming device 204 may determine the set of candidate search strings locally, while in other embodiments the content streaming device 204 may send the second voice data to a remote server for processing of the second voice data, and may receive a set of candidate search strings from the remote server identified from the processing of the second voice data. The candidate search options or search strings may provide search terms in the form of text, graphics, and the like for use in a content search.

At block 264 of the process flow 200, computer-executable instructions of one or more module(s) stored on a memory of the content streaming device 204 may be executed to present the candidate search queries. For example, with reference to FIG. 10, the content streaming device 204 may present a user interface of a first voice search card 380 at the display device 300. The first voice search card 380 may include candidate search queries or options 390, and in some embodiments, a text search option 450. The candidate search options 390 may include one or more selectable search options that, when selected, initiate a content search for the selected option. The text-search option 450 may cause a text searching user interface to be presented that may facilitate text based searching for content. While this example relates to text searching, other embodiments of the disclosure may include voice dictation themes, such as speech-to-text applications, or mobile application-specific themes, such as voice commands in a calendar or map application. In such embodiments, a default theme may be used until a virtual assistant trigger word is detected.

Figure 10:
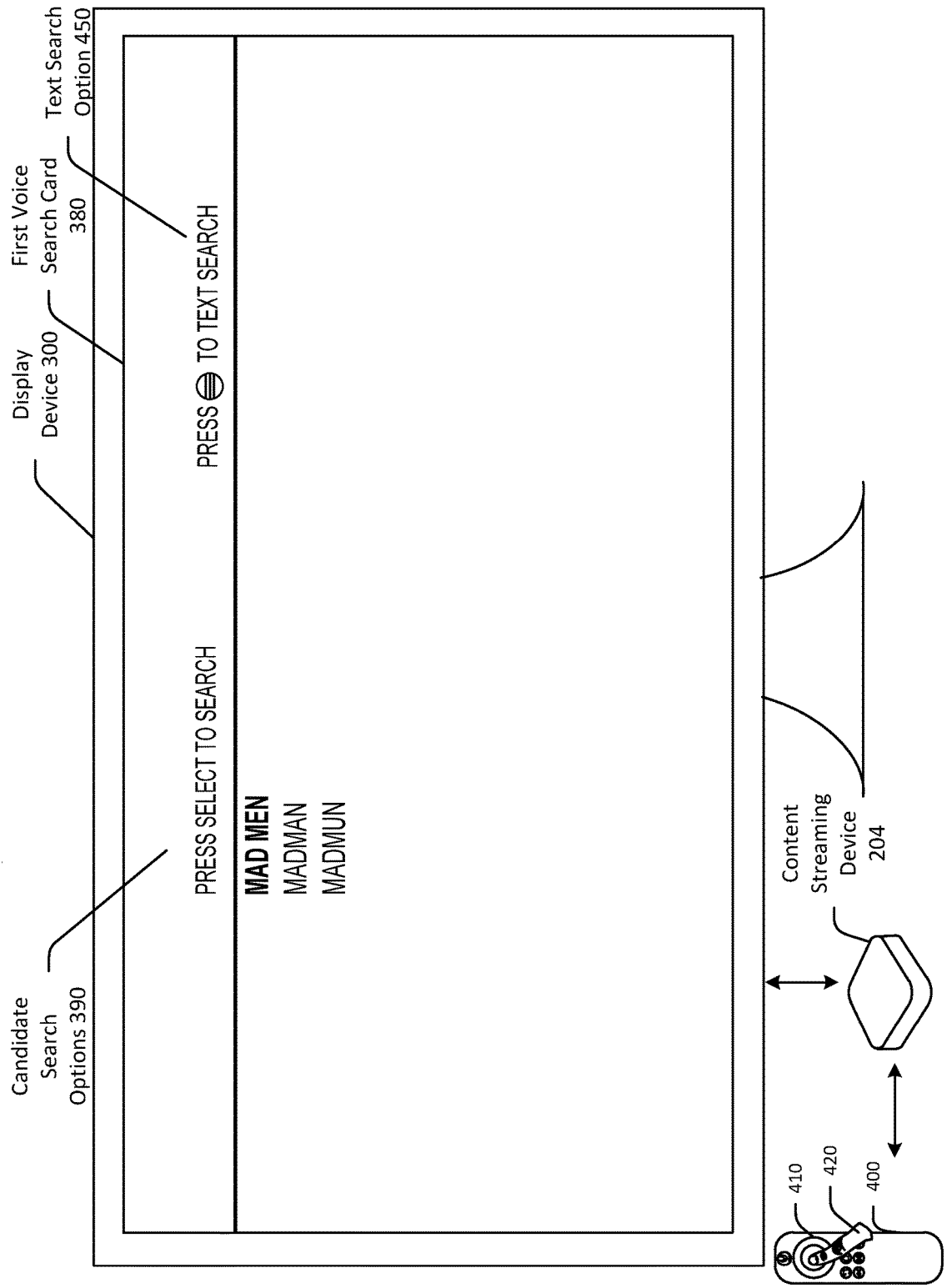
FIGS. 10-12 are schematic illustrations of example user interfaces presenting voice search card information in accordance with one or more example embodiments of the disclosure.
Figure 11:
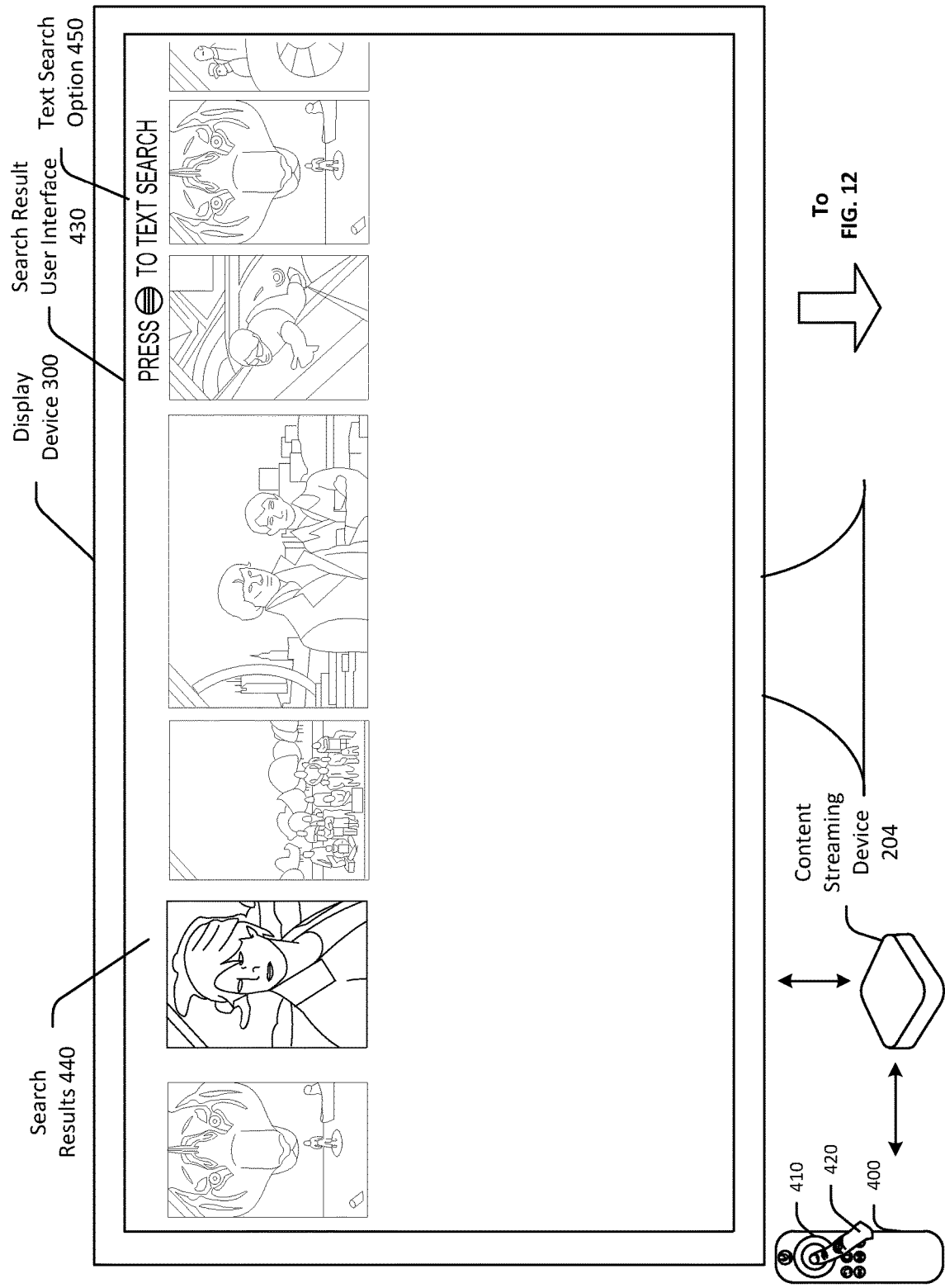

In FIG. 10, the content streaming device 204 may present information associated with the set of candidate search options 390 at the display device 300. For example, the candidate search options 390 may include "mad men," "madman," and "madmun," and may be based at least in part on the second voice data. The candidate search options 390 may be presented as text, graphics, or in other digital forms. A user may select one of the presented search options 390 to initiate a content search for the selected search option. For example, the user may select one of the candidate search options 390 via a remote control device 400. The remote control device 400 may have a selection wheel or input 410 that the user may use to input a user selection 420 for one of the candidate search options 390.

At block 266 of the process flow 200 in FIG. 4, computer-executable instructions of one or more module(s) stored on a memory of the content streaming device 204 may be executed to determine a selection of a candidate search option for searching. For example, the user may select "mad men" in the candidate search options 390 via the remote control device 400 in FIG. 10. The content streaming device 204 may receive an indication of a selection of a selected candidate search string or candidate search option. In some embodiments, the content streaming device 204 may send the selected candidate search string to a remote server for content searching to identify content relevant to the selected candidate search string, while in other embodiments, the content streaming device 204 may perform content searching.

In certain embodiments, the content streaming device 204 may receive a set of search results that may include content selection options based at least in part on the selected search option. In other embodiments, the content streaming device 204 may determine search results, that may include content selection options, in response to the selected candidate search option. Metadata associated with the content selection options (e.g., title, plot summary, etc.) may be communicated to or determined by the content streaming device 204, which may direct presentation of the metadata via the display device 300.

At block 268 of the process flow 200, computer-executable instructions of one or more module(s) stored on a memory of the content streaming device 204 may be executed to present search results at the display device. For example, with reference to FIG. 11, the content streaming device 204 may present a user interface of a search result user interface 430 at the display device 300 with search results 440. The search results 440 may be selectable content options determined in response to the second voice data. For example, the search results 440 may include cover art and other metadata associated with one or more content selection options. The user may select one of the content selection options to begin consumption of the selected content option. The search results 440, and/or content selection options identified as part of the voice-based searching functionality described herein may include one or more content items (e.g., movies) identified as having a threshold level of relevance to the processed voice data (e.g., a speech-to-text translation of the data).

In some instances, the search results 440 may be different than what a user wanted, or a user may decide to conduct another search after viewing the search results 440. For example, in FIG. 11, the user may select the text search option 450. The text search option 450 may be selected as an onscreen element as part of the search result user interface 430, and/or may be associated with a physical or virtual button at the remote control device 400.

Figure 12:
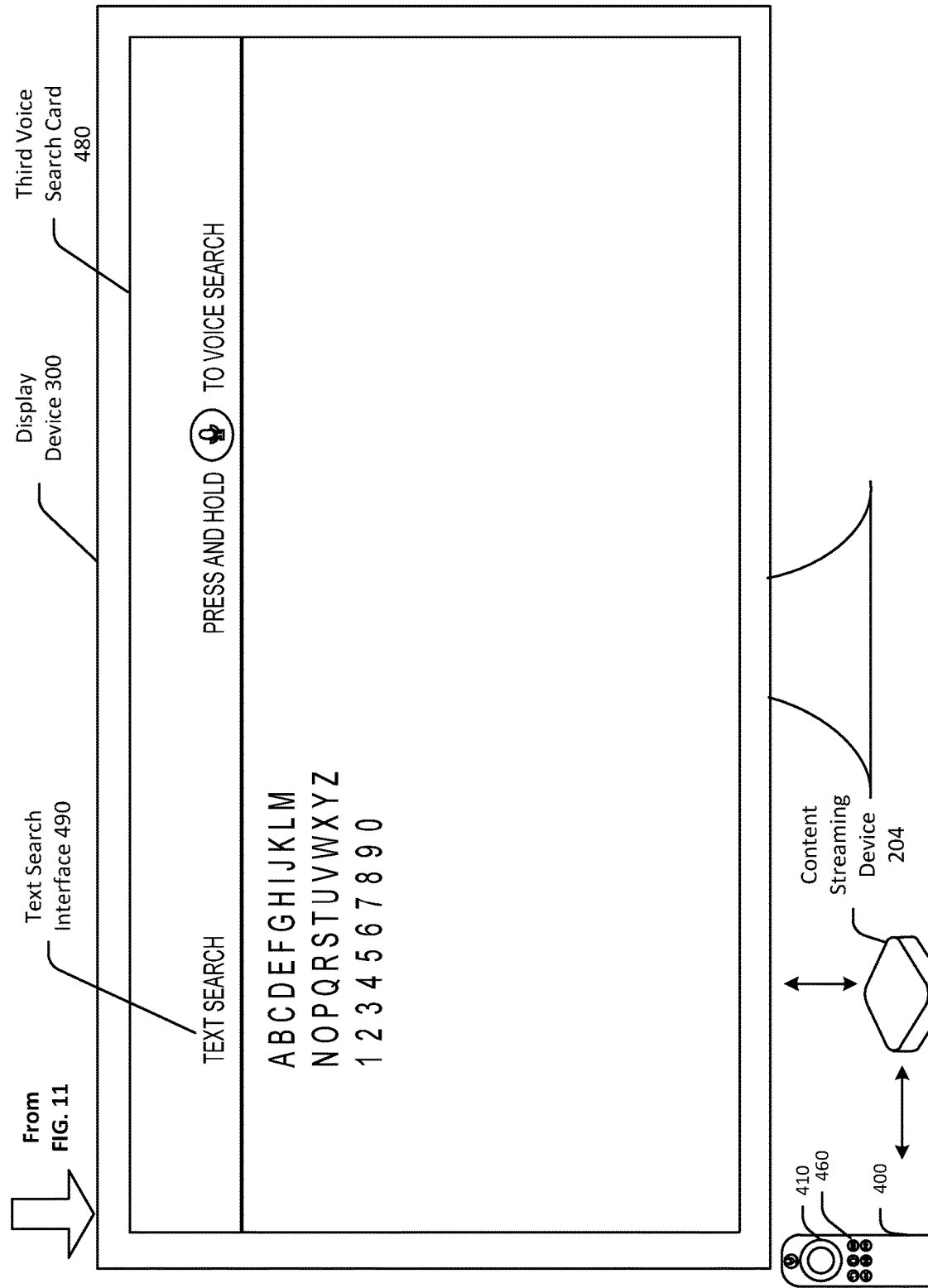

In FIG. 12, upon selecting the text search option 450, the content streaming device 204 may generate a user interface with a third voice search card 480 at the display device 300. The third voice search card 480 may include a text input interface 490 configured to receive input from a user for text. For example, a user may use the remote control device 400 to navigate the text input interface 490, and select one or more characters in order to input a text-based search. Upon completion of user input, the content streaming device 204 may initiate a content search based, at least in part, on the textual input by the user at the text input interface 490.

One or more operations of the method, process flows, or use cases of FIGS. 2-12 may have been described above as being performed by a user device, or more specifically, by one or more program modules, applications, or the like executing on a device. It should be appreciated, however, that any of the operations of methods, process flows, or use cases of FIGS. 2-12 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 2-12 may be described in the context of the illustrative devices, it should be appreciated that such operations may be implemented in connection with numerous other device configurations.

The operations described and depicted in the illustrative methods, process flows, and use cases of FIGS. 2-12 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-12 may be performed.

Although specific embodiments of the disclosure have been described, one of ordinary skill in the art will recognize that numerous other modifications and alternative embodiments are within the scope of the disclosure. For example, any of the functionality, and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components, and/or operations beyond those depicted in blocks of the block, and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 13:
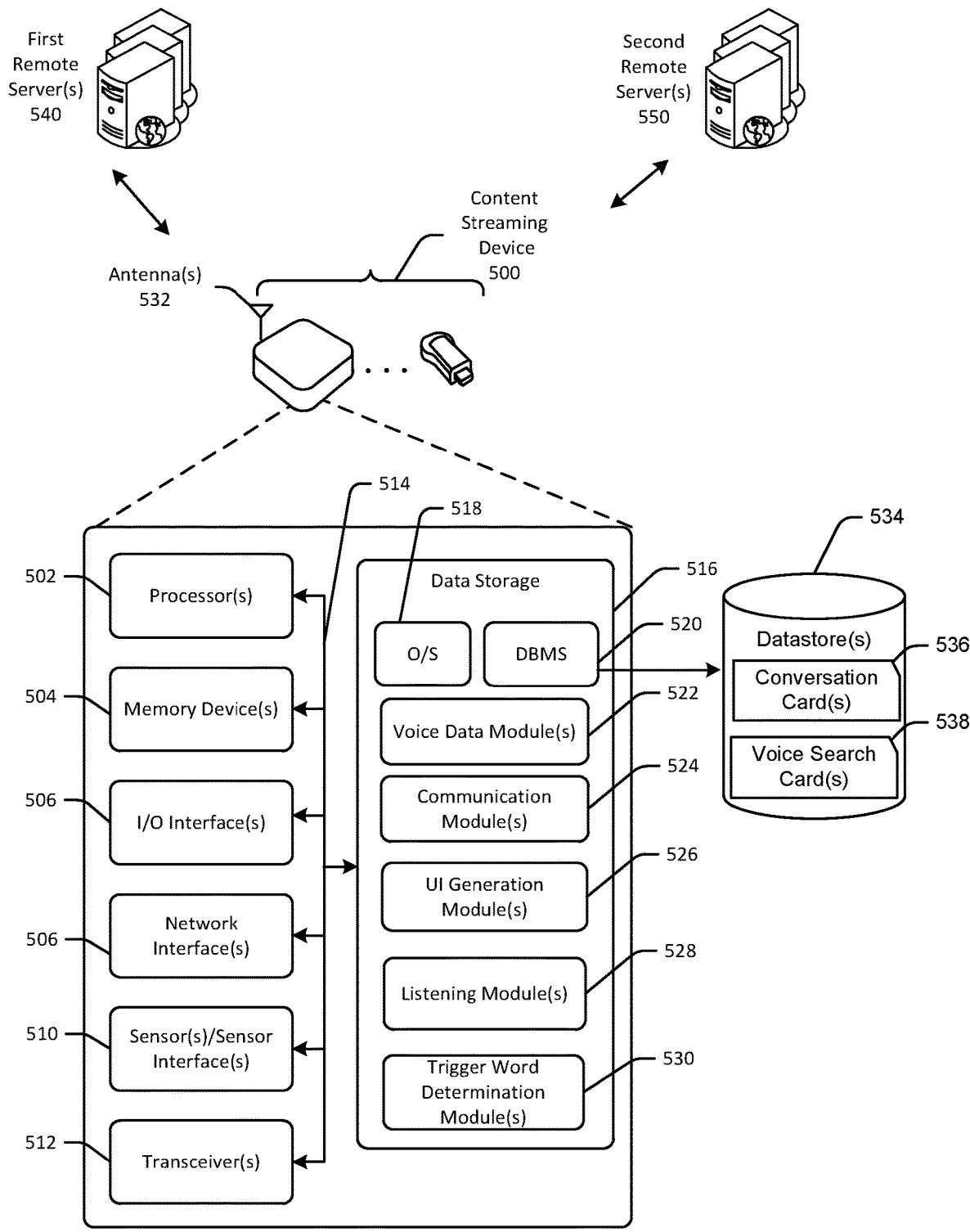
FIG. 13 is a schematic block diagram of an illustrative content streaming device in accordance with one or more example embodiments of the disclosure.

FIG. 13 is a schematic block diagram of an illustrative content streaming device 500 in accordance with one or more example embodiments of the disclosure. The content streaming device 500 may include any suitable computing device including, but not limited to, a mobile device such as a smartphone, tablet, e-reader, wearable device, or the like; a desktop computer; a laptop computer; a content streaming device; a set-top box, or the like. The content streaming device 500 may correspond to an illustrative device configuration for the content streaming devices 104, 204 of FIGS. 2-12.

The content streaming device 500 may be configured to communicate via one or more networks (not shown) with one or more servers, user devices, or the like. For example, in the illustration of FIG. 13, the content streaming device 500 may be configured to communicate with a first remote server 540 and a second remote server 550. The first remote server 540 may be configured to perform a first type of voice processing, such as conversational voice processing, while the second remote server 550 may be configured to perform a second type of voice processing, such as voice searching. In some embodiments, a single remote server or single group of remote servers may be configured to perform more than one type of voice processing.

The content streaming device 500 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content streaming device 500 may include one or more processors (processor(s)) 502, one or more memory device(s) 504 (generically referred to herein as memory 504), one or more input/output ("I/O") interface(s) 506, one or more network interfaces 508, one or more sensor(s) or sensor interface(s) 510, one or more transceiver(s) 512, and data storage 516. The content streaming device 500 may further include one or more bus(es) 514 that functionally couple various components of the content streaming device 500. The content streaming device 500 may further include one or more antenna(s) 532 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail, hereinafter.

The bus(es) 514 may include at least one of a system bus, a memory bus, an address bus, or a message bus, and may permit exchange of information (e.g., data (including computer-executable code), signaling, etc.) between various components of the content streaming device 500. The bus(es) 514 may include, without limitation, a memory bus or a memory controller, a peripheral bus, an accelerated graphics port, and so forth. The bus(es) 514 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the content streaming device 500 may include volatile memory (memory that maintains its state when supplied with power) such as random access memory (RAM), and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory, such as a data cache, may be a multi-level cache organized as a hierarchy of one or more cache levels (L1, L2, etc.).

The data storage 516 may include removable storage, and/or non-removable storage including, but not limited to, magnetic storage, optical disk storage, and/or tape storage. The data storage 516 may provide non-volatile storage of computer-executable instructions and other data. The memory 504 and the data storage 516, removable and/or non-removable, are examples of computer-readable storage media (CRSM) as that term is used herein.

The data storage 516 may store computer-executable code, instructions, or the like that may be loadable into the memory 504 and executable by the processor(s) 502 to cause the processor(s) 502 to perform or initiate various operations. The data storage 516 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 516 for non-volatile storage.

More specifically, the data storage 516 may store one or more operating systems (O/S) 518; one or more database management systems (DBMS) 520, and one or more program modules, applications, engines, computer-executable code, scripts, or the like such as, for example, one or more voice data module(s) 522, one or more communication module(s) 524, one or more user interface generation module(s) 526, one or more listening module(s) 528, and one or more trigger word determination module(s) 530. Some or all of these modules may be sub-modules. Any of the components depicted as being stored in data storage 516 may include any combination of software, firmware, and/or hardware. The software, and/or firmware may include computer-executable code, instructions, or the like that may be loaded into the memory 504 for execution by one or more of the processor(s) 502. Any of the components depicted as being stored in data storage 516 may support functionality described in reference to correspondingly named components earlier in this disclosure.

The data storage 516 may further store various types of data utilized by components of the content streaming device 500. Any data stored in the data storage 516 may be loaded into the memory 504 for use by the processor(s) 502 in executing computer-executable code. In addition, any data depicted as being stored in the data storage 516 may potentially be stored in one or more datastore(s) 534 and may be accessed via the DBMS 520 and loaded in the memory 504 for use by the processor(s) 502 in executing computer-executable code. The datastore(s) 534 may include, but are not limited to, databases (e.g., relational, object-oriented, etc.), file systems, flat files, distributed datastores in which data is stored on more than one node of a computer network, peer-to-peer network datastores, or the like. In FIG. 13, the datastore(s) 534 may include one or more conversation card(s) 536, which may be used to generate user interfaces for verbal requests or queries, and one or more voice search card(s) 538, which may be used to generate user interfaces for voice searching. The respective cards 536, 538 may include formatting instructions, presentation instructions, prepopulated fields, and other information, for example.

The processor(s) 502 may be configured to access the memory 504, and execute computer-executable instructions loaded therein. For example, the processor(s) 502 may be configured to execute computer-executable instructions of the various program modules, applications, engines, or the like of the content streaming device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program modules depicted in FIG. 13, the voice data module(s) 522 may include computer-executable instructions, code, or the like that responsive to execution by one or more of the processor(s) 502 may perform functions including, but not limited to, monitoring for voice data, processing voice data, and/or sending or receiving voice data from a wirelessly connected device.

The communication module(s) 524 may include computer-executable instructions, code, or the like that responsive to execution by one or more of the processor(s) 502 may perform functions including, but not limited to, communicating with one or more devices, for example, via wired or wireless communication.

The user interface generation module(s) 526 may include computer-executable instructions, code, or the like that are responsive to execution by one or more of the processor(s) 502 may perform functions including, but not limited to, generating visual feedback, generating user interfaces for presentation at a display device, and the like.

The listening module(s) 528 may include computer-executable instructions, code, or the like that responsive to execution by one or more of the processor(s) 502 may perform functions including, but not limited to, transitioning from a pre-listen to a listen to a processing state.

The trigger word determination module(s) 530 may include computer-executable instructions, code, or the like that are responsive to execution by one or more of the processor(s) 502 may perform functions including, but not limited to, determining whether voice data includes a trigger word.

Referring now to other illustrative components depicted as being stored in the data storage 516, the O/S 518 may be loaded from the data storage 516 into the memory 504 and may provide an interface between other application software executing on the content streaming device 500, and hardware resources of the content streaming device 500. More specifically, the O/S 518 may include a set of computer-executable instructions for managing hardware resources of the content streaming device 500, and for providing common services to other application programs (e.g., managing memory allocation among various application programs). In certain example embodiments, the O/S 518 may control execution of the other program modules to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504, and may support functionality for accessing, retrieving, storing, and/or manipulating data stored in the memory 504, and/or data stored in the data storage 516. The DBMS 520 may use any of a variety of database models (e.g., relational model, object model, etc.), and may support any of a variety of query languages. The DBMS 520 may access data represented in one or more data schemas, and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content streaming device 500 is a mobile device, the DBMS 520 may be any suitable lightweight DBMS optimized for performance on a mobile device.

Referring now to other illustrative components depicted as being stored in the data storage 516, the O/S 518 may be loaded from the data storage 516 into the memory 504, and may provide an interface between other application software executing on the content streaming device 500, and hardware resources of the content streaming device 500. More specifically, the O/S 518 may include a set of computer-executable instructions for managing hardware resources of the content streaming device 500 and for providing common services to other application programs (e.g., managing memory allocation among various application programs). In certain example embodiments, the O/S 518 may control execution of one or more of the program modules depicted as being stored in the data storage 516. The O/S 518 may include any operating system now known or which may be developed in the future including, but not limited to, any server operating system, any mainframe operating system, or any other proprietary or non-proprietary operating system.

The DBMS 520 may be loaded into the memory 504, and may support functionality for accessing, retrieving, storing, and/or manipulating data stored in the memory 504, and/or data stored in the data storage 516. The DBMS 520 may use any of a variety of database models (e.g., relational model, object model, etc.), and may support any of a variety of query languages. The DBMS 520 may access data represented in one or more data schemas, and stored in any suitable data repository. In certain example embodiments, the DBMS 520 may be any suitable lightweight DBMS optimized for performance on a mobile device.

Referring now to other illustrative components of the content streaming device 500, the input/output (I/O) interface(s) 506 may facilitate the receipt of input information by the content streaming device 500 from one or more I/O devices as well as the output of information from the content streaming device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit, and so forth. Any of these components may be integrated into the content streaming device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(s) 532 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The content streaming device 500 may further include one or more network interfaces 508 via which the content streaming device 500 may communicate with any of a variety of other systems, platforms, networks, devices, and so forth. The network interface(s) 508 may enable communication, for example, with the wireless router 108, the host server 112, and/or one or more web servers (e.g., the web server 406) via one or more of the network(s) 110.

The antenna(s) 532 may include any suitable type of antenna depending, for example, on the communications protocols used to transmit or receive signals via the antenna(s) 532. Non-limiting examples of suitable antennas may include directional antennas, non-directional antennas, dipole antennas, folded dipole antennas, patch antennas, multiple-input multiple-output (MIMO) antennas, or the like. The antenna(s) 532 may be communicatively coupled to one or more transceivers 512 or radio components to which or from which signals may be transmitted or received.

As previously described, the antenna(s) 532 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 532 may additionally, or alternatively, include a Wi-Fi antenna configured to transmit or receive signals in accordance with established standards and protocols, such as the IEEE 502.11 family of standards, including via 2.4 GHz channels (e.g., 502.11b, 502.11g, 502.11n), 5 GHz channels (e.g., 502.11n, 502.11ac), or 60 GHz channels (e.g., 502.11ad). In alternative example embodiments, the antenna(s) 532 may be configured to transmit or receive radio frequency signals within any suitable frequency range forming part of the unlicensed portion of the radio spectrum.

The antenna(s) 532 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(s) 532—transmitting or receiving radio frequency (RF) signals in the bandwidth, and/or channels corresponding to the communications protocols utilized by the content streaming device 500 to communicate with other devices. The transceiver(s) 512 may include hardware, software, and/or firmware for modulating, transmitting, or receiving—potentially in cooperation with any of antenna(s) 532—communications signals according to any of the communications protocols discussed above including, but not limited to, one or more Wi-Fi, and/or Wi-Fi direct protocols, as standardized by the IEEE 502.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the content streaming device 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 13 as being stored in the data storage 516 are merely illustrative and not exhaustive, and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the content streaming device 500, and/or hosted on other computing device(s) accessible via one or more networks, may be provided to support functionality provided by the program modules, applications, or computer-executable code depicted in FIG. 13, and/or additional, or alternate functionality. Further, functionality may be modularized differently such that processing described as being supported collectively by the collection of program modules depicted in FIG. 13 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 13 may be implemented, at least partially, in hardware, and/or firmware across any number of devices.

It should further be appreciated that the content streaming device 500 may include alternate, and/or additional hardware, software, or firmware components beyond those described or depicted without departing from the scope of the disclosure. More particularly, it should be appreciated that software, firmware, or hardware components depicted as forming part of the content streaming device 500 are merely illustrative, and that some components may not be present or additional components may be provided in various embodiments. While various illustrative program modules have been depicted and described as software modules stored in data storage 516, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality, and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality, and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-12 may be performed by a device having the illustrative configuration depicted in FIG. 13, or more specifically, by one or more engines, program modules, applications, or the like executable on such a device. It should be appreciated, however, that such operations may be implemented in connection with numerous other device configurations.

The operations described and depicted in the illustrative methods and process flows of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality, and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components, and/or operations beyond those depicted in blocks of the block, and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture, and/or operating system platform. A software component comprising assembly language instructions may require conversion into executable machine code by an assembler prior to execution by the hardware architecture, and/or platform.

Another example of programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features, and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
   memory that stores computer-executable instructions; and
   at least one processor configured to access the memory and execute the computer-executable instructions to:
   receive first voice data, wherein the first voice data is indicative of a selection of first content from a set of content search results, wherein the first voice data is associated with a button interaction at a remote control;
   cause presentation of first audio content and associated first conversation card by the device;
   receive second voice data from the remote control;
   determine that the second voice data is a request for second audio data and a second conversation card;
   automatically determine to stop to the presentation of first audio data and first conversation card;
   cause presentation of the second audio data and the second conversation card; and
   cause, at an end point of the second audio data, continued presentation of the first conversation card and the first audio data,
   wherein the first conversation card includes a template-based data structure for presenting information.

2. The device of claim 1, wherein the end point of the second audio data is based on at least one of a predetermined time for presenting the second audio data or a completion of the second audio data.

3. The device of claim 1, wherein the at least one processor is further configured to execute the computer-executable instructions to:
   determine that the second voice data includes a request for the second audio data and the second conversation card.

4. The device of claim 1, wherein to stop the presentation of the first audio data includes at least one of cancel, pause or attenuate presentation of the first audio data.

5. The device of claim 1, wherein the second conversation card is overlaid the first conversation card when the second conversation card is being presented.

6. The device of claim 1, wherein to cause continued presentation of the first conversation card and the first audio data includes to resume presentation of the first audio data at approximately a point in the presentation of the first audio data when the second voice data was received.

7. The device of claim 1, wherein to cause continued presentation of the first conversation card and the first audio data includes to resume presentation of the first audio data in progress.

8. The device of claim 1, wherein the at least one processor is further configured to execute the computer-executable instructions to:
   receive a pre-listen indication from the remote control; and
   cause the device to enter a pre-listen state.

9. The device of claim 1, wherein the at least one processor is further configured to execute the computer-executable instructions to:
   cause presentation of the set of content search results in a tile-based user interface format.

10. The device of claim 1, wherein the remote control is a smartphone, and wherein the device is coupled to a display via an HDMI interface.

11. The device of claim 1, wherein the button interaction at the remote control is a button hold gesture at the remote control.

12. A method comprising:
    receiving, by a computer system in communication with a display, first voice data indicative of a selection of first content from a set of content search results, wherein the first voice data is associated with a button interaction at a remote control;
    causing presentation of first audio content and associated first conversation card by a device;
    receiving second voice data from the remote control;
    determining that the second voice data is a request for second audio data and a second conversation card;
    automatically determining to stop to the presentation of first audio data and first conversation card
    causing presentation of the second audio data and the second conversation card; and
    causing, at an end point of the second audio data, continued presentation of the first conversation card and the first audio data,
    wherein the first conversation card includes a template-based data structure for presenting information.

13. The method of claim 12, wherein the end point of the second audio data is based on at least one of a predetermined time for presenting the second audio data or a completion of the second audio data.

14. The method of claim 12, further comprising determining that the second voice data is a request for the second audio data and the second conversation card.

15. The method of claim 12, wherein to cause continued presentation of the first conversation card and the first audio data includes to resume presentation of the first audio data at approximately a point in the presentation of the first audio data when the second voice data was received.

16. The method of claim 12, wherein to cause continued presentation of the first conversation card and the first audio data includes to resume presentation of the first audio data in progress.

17. The method of claim 12, further comprising:
    receiving a pre-listen indication from the remote control; and
    causing the computer system to enter a pre-listen state.

18. The method of claim 12, wherein the remote control is a smartphone.

19. The method of claim 12, wherein the computer system is coupled to the display via an HDMI interface.

20. The method of claim 12, wherein stopping the presentation of the first audio data includes at least one of canceling, pausing or attenuating presentation of the first audio data.

* * * * *